(12) United States Patent
Asghari et al.

(10) Patent No.: US 12,339,399 B2
(45) Date of Patent: Jun. 24, 2025

(54) OPTICAL SWITCHING FOR TUNING DIRECTION OF LIDAR OUTPUT SIGNALS

(71) Applicant: SiLC Technologies, Inc., Monrovia, CA (US)

(72) Inventors: Mehdi Asghari, La Canada Flintridge, CA (US); Dazeng Feng, El Monte, CA (US); Bradley Jonathan Luff, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 435 days.

(21) Appl. No.: 17/858,977

(22) Filed: Jul. 6, 2022

(65) Prior Publication Data
US 2022/0342048 A1 Oct. 27, 2022

Related U.S. Application Data

(62) Division of application No. 16/277,790, filed on Feb. 15, 2019, now Pat. No. 11,536,805.

(60) Provisional application No. 62/689,716, filed on Jun. 25, 2018.

(51) Int. Cl.
*G01S 7/481* (2006.01)
*G01S 17/89* (2020.01)
*G02B 26/08* (2006.01)

(52) U.S. Cl.
CPC .......... *G01S 7/4817* (2013.01); *G01S 17/89* (2013.01); *G02B 26/0833* (2013.01)

(58) Field of Classification Search
None
See application file for complete search history.

(56) References Cited

U.S. PATENT DOCUMENTS

| | | | |
|---|---|---|---|
| 4,262,993 A | 4/1981 | Burns et al. |
| 4,523,803 A | 6/1985 | Arao et al. |
| 4,786,132 A | 11/1988 | Gordon |
| 4,845,703 A | 7/1989 | Suzuki |
| 4,914,665 A | 4/1990 | Sorin |

(Continued)

FOREIGN PATENT DOCUMENTS

| CN | 1668939 A | 9/2005 |
|---|---|---|
| CN | 101356450 A | 1/2009 |

(Continued)

OTHER PUBLICATIONS

Brosa, Anna-Maria, Extended European Search Report, Application No. 19824826.2, European Patent Office, Feb. 21, 2022.

(Continued)

*Primary Examiner* — Luke D Ratcliffe
(74) *Attorney, Agent, or Firm* — Gavrilovich, Dodd & Lindsey LLP

(57) ABSTRACT

An optical system has a LIDAR chip that includes a switch configured to direct an outgoing LIDAR signal to one of multiple different alternate waveguides. The system also includes a redirection component configured to receive the outgoing LIDAR signal from any one of the alternate waveguides. The redirection component is also configured to redirect the received outgoing LIDAR signal such that a direction that the outgoing LIDAR signal travels away from the redirection component changes in response to changes in the alternate waveguide to which the optical switch directs the outgoing LIDAR signal.

19 Claims, 7 Drawing Sheets

(56) References Cited

U.S. PATENT DOCUMENTS

| | | |
|---|---|---|
| 4,955,028 A | 9/1990 | Alfeness et al. |
| 4,987,832 A | 1/1991 | Klink et al. |
| 4,995,720 A | 2/1991 | Amzajerdian |
| 5,041,832 A | 8/1991 | Gulczynski |
| 5,194,906 A | 3/1993 | Kimura et al. |
| 5,289,252 A | 2/1994 | Nourrcier |
| 5,323,223 A | 6/1994 | Hayes |
| 5,396,328 A | 3/1995 | Jestel et al. |
| 5,847,816 A | 12/1998 | Zediker et al. |
| 5,889,490 A | 3/1999 | Wachter et al. |
| 5,953,468 A | 9/1999 | Finnila et al. |
| 5,977,538 A | 11/1999 | Unger et al. |
| 5,995,810 A | 11/1999 | Karasawa |
| 6,035,083 A | 3/2000 | Brennan, III et al. |
| 6,040,898 A | 3/2000 | Mrosik et al. |
| 6,108,472 A | 8/2000 | Rickman et al. |
| 6,400,500 B1 | 6/2002 | Tidmarsh et al. |
| 6,480,513 B1 | 11/2002 | Kapany et al. |
| 6,556,769 B1 | 4/2003 | Roberts et al. |
| 6,567,573 B1 | 5/2003 | Domash et al. |
| 6,687,010 B1 | 2/2004 | Horri et al. |
| 6,921,490 B1 | 7/2005 | Qian et al. |
| 6,970,621 B1 | 11/2005 | Fried |
| 6,977,502 B1 | 12/2005 | Hertz |
| 7,345,744 B2 | 3/2008 | Halmos et al. |
| 7,375,877 B1 | 5/2008 | Di Teodoro et al. |
| 7,535,390 B2 | 5/2009 | Hsu |
| 7,907,333 B2 | 3/2011 | Coyle |
| 8,165,433 B2 | 4/2012 | Jenkins et al. |
| 8,213,751 B1 | 7/2012 | Ho et al. |
| 8,311,374 B2 | 11/2012 | Hochberg et al. |
| 8,326,100 B2 | 12/2012 | Chen et al. |
| 8,410,566 B2 | 4/2013 | Qian et al. |
| 8,541,744 B1 | 9/2013 | Liu |
| 8,558,993 B2 | 10/2013 | Newbury et al. |
| 8,885,678 B1 | 11/2014 | Kupershmidt |
| 9,157,790 B2 | 10/2015 | Shpunt et al. |
| 9,176,282 B2 | 11/2015 | Pottier et al. |
| 9,235,097 B2 | 1/2016 | Meade et al. |
| 9,310,471 B2 | 4/2016 | Sayyah et al. |
| 9,310,487 B2 | 4/2016 | Sakimura et al. |
| 9,519,052 B2 | 12/2016 | Gusev |
| 9,575,341 B2 | 2/2017 | Heck et al. |
| 9,606,234 B2 | 3/2017 | Major, Jr. et al. |
| 9,625,580 B2 | 4/2017 | Kotelnikov et al. |
| 9,735,885 B1 | 8/2017 | Sayyah et al. |
| 9,740,079 B1 * | 8/2017 | Davids ................. G02B 6/1347 |
| 9,748,726 B1 | 8/2017 | Morton et al. |
| 9,753,351 B2 | 9/2017 | Eldada |
| 9,778,363 B2 | 10/2017 | Kadambi et al. |
| 9,798,166 B1 | 10/2017 | Sharma et al. |
| 9,823,118 B2 | 11/2017 | Doylend et al. |
| 9,841,495 B2 | 12/2017 | Campbell et al. |
| 9,851,443 B2 | 12/2017 | Chen |
| 9,857,468 B1 | 1/2018 | Eichenholz et al. |
| 9,893,737 B1 | 2/2018 | Keramat et al. |
| 10,003,168 B1 | 6/2018 | Villeneuve |
| 10,007,060 B1 | 6/2018 | Qian et al. |
| 10,094,916 B1 | 10/2018 | Droz et al. |
| 10,137,903 B2 | 11/2018 | Tascione et al. |
| 10,222,474 B1 | 3/2019 | Raring et al. |
| 10,274,599 B2 | 4/2019 | Schmalenberg |
| 10,281,322 B2 | 5/2019 | Doylend et al. |
| 10,345,447 B1 | 7/2019 | Hicks |
| 10,397,019 B2 | 8/2019 | Hartung et al. |
| 10,564,268 B2 | 2/2020 | Turbide et al. |
| 10,605,901 B2 | 3/2020 | Lee et al. |
| 10,627,496 B2 | 4/2020 | Schmalenberg et al. |
| 10,739,256 B1 | 8/2020 | Rickman et al. |
| 10,761,195 B2 | 9/2020 | Donovan |
| 10,782,782 B1 | 9/2020 | DeSalvo et al. |
| 10,788,582 B2 | 9/2020 | Feng et al. |
| 10,816,649 B1 | 10/2020 | Keyser et al. |
| 10,845,480 B1 | 11/2020 | Shah et al. |
| 10,901,074 B1 | 1/2021 | Pan et al. |
| 11,022,683 B1 | 6/2021 | Rezk |
| 11,067,668 B1 | 7/2021 | Bravo |
| 11,114,815 B1 | 9/2021 | Chen et al. |
| 11,119,219 B1 | 9/2021 | LaChapelle et al. |
| 11,162,789 B2 | 11/2021 | Lodin et al. |
| 11,170,476 B1 | 11/2021 | Toshiwal et al. |
| 11,175,388 B1 | 11/2021 | Wood et al. |
| 11,221,404 B1 | 1/2022 | DeSalvo et al. |
| 11,300,683 B2 | 4/2022 | Bao et al. |
| 11,378,691 B2 | 7/2022 | Boloorian et al. |
| 11,448,729 B2 | 9/2022 | Baba et al. |
| 11,454,724 B2 | 9/2022 | Michaels et al. |
| 11,486,975 B1 | 11/2022 | Xiao |
| 11,493,753 B1 | 11/2022 | Wood et al. |
| 11,536,805 B2 | 12/2022 | Asghari et al. |
| 11,579,300 B1 | 2/2023 | Li |
| 11,635,491 B2 | 4/2023 | Asghari et al. |
| 11,714,167 B2 | 8/2023 | Feng et al. |
| 11,815,720 B1 | 11/2023 | Tavallaee et al. |
| 2002/0031304 A1 | 3/2002 | Roberts et al. |
| 2002/0105632 A1 | 8/2002 | Holton |
| 2002/0122398 A1 | 9/2002 | Jou |
| 2002/0159700 A1 | 10/2002 | Coroy et al. |
| 2003/0030582 A1 | 2/2003 | Vickers |
| 2003/0031407 A1 | 2/2003 | Weisberg et al. |
| 2003/0142943 A1 | 7/2003 | Yegnanarayanan et al. |
| 2003/0212520 A1 | 11/2003 | Campos et al. |
| 2003/0231686 A1 | 12/2003 | Liu |
| 2004/0081388 A1 | 4/2004 | Koyama |
| 2004/0085612 A1 | 5/2004 | Livingston et al. |
| 2004/0233964 A1 | 11/2004 | Yamanaka et al. |
| 2004/0249561 A1 | 12/2004 | Capozzi et al. |
| 2005/0123227 A1 | 6/2005 | Vonsovici et al. |
| 2005/0135730 A1 | 6/2005 | Welch et al. |
| 2005/0219068 A1 | 10/2005 | Jones et al. |
| 2005/0237617 A1 | 10/2005 | Carr et al. |
| 2005/0244103 A1 | 11/2005 | Kwakernaak |
| 2006/0114447 A1 | 6/2006 | Harris et al. |
| 2007/0024849 A1 | 2/2007 | Carrig et al. |
| 2007/0036486 A1 | 2/2007 | Miyadera et al. |
| 2007/0103362 A1 | 5/2007 | Arikan et al. |
| 2007/0171407 A1 | 7/2007 | Cole et al. |
| 2007/0223856 A1 | 9/2007 | Nunoya et al. |
| 2008/0088184 A1 | 4/2008 | Tung et al. |
| 2008/0123170 A1 | 5/2008 | Reichert et al. |
| 2008/0174461 A1 | 7/2008 | Hsu |
| 2008/0176681 A1 | 7/2008 | Donahoe |
| 2008/0181550 A1 | 7/2008 | Earnshaw |
| 2008/0205461 A1 | 8/2008 | Henrichs |
| 2009/0046746 A1 | 2/2009 | Munroe et al. |
| 2009/0128797 A1 | 5/2009 | Walsh |
| 2009/0195769 A1 | 8/2009 | Luo et al. |
| 2009/0279070 A1 | 11/2009 | Ueno et al. |
| 2010/0027379 A1 | 2/2010 | Saulnier et al. |
| 2010/0085992 A1 | 4/2010 | Rakuljic et al. |
| 2010/0159858 A1 | 6/2010 | Dent et al. |
| 2010/0187442 A1 | 7/2010 | Hochberg et al. |
| 2010/0271614 A1 | 10/2010 | Albuquerque et al. |
| 2010/0277714 A1 | 11/2010 | Pedersen et al. |
| 2010/0280765 A1 | 11/2010 | Marquardt et al. |
| 2010/0296077 A1 | 11/2010 | Scott et al. |
| 2010/0309391 A1 | 12/2010 | Plut |
| 2011/0026643 A1 | 2/2011 | Ruelke et al. |
| 2011/0068425 A1 | 3/2011 | Liao et al. |
| 2011/0091155 A1 | 4/2011 | Yilmaz et al. |
| 2011/0095167 A1 | 4/2011 | Feng et al. |
| 2011/0141471 A1 | 6/2011 | Schlotterbeck et al. |
| 2011/0164845 A1 | 7/2011 | Jenkins et al. |
| 2011/0241895 A1 | 10/2011 | Griffin |
| 2012/0038506 A1 | 2/2012 | Kanamoto et al. |
| 2012/0062230 A1 | 3/2012 | Vaughan, Jr. et al. |
| 2012/0081786 A1 | 4/2012 | Mizuyama et al. |
| 2012/0098935 A1 | 4/2012 | Schmidt et al. |
| 2012/0120382 A1 | 5/2012 | Silny et al. |
| 2012/0182544 A1 | 7/2012 | Asahara et al. |
| 2012/0206712 A1 | 8/2012 | Chang et al. |
| 2013/0044311 A1 | 2/2013 | Rakuljic |
| 2013/0051655 A1 | 2/2013 | Collard et al. |
| 2013/0056623 A1 | 3/2013 | Lipson et al. |

(56) References Cited

U.S. PATENT DOCUMENTS

| | | |
|---|---|---|
| 2013/0083389 A1 | 4/2013 | Dakin et al. |
| 2013/0162976 A1 | 6/2013 | Dakin et al. |
| 2013/0206967 A1 | 8/2013 | Shpunt et al. |
| 2013/0242400 A1 | 9/2013 | Chen |
| 2013/0321791 A1 | 12/2013 | Feldkhun et al. |
| 2014/0035776 A1 | 2/2014 | Sochen et al. |
| 2014/0036252 A1 | 2/2014 | Amzajerdian et al. |
| 2014/0054451 A1 | 2/2014 | Abedin et al. |
| 2014/0112357 A1 | 4/2014 | Abedin et al. |
| 2014/0153931 A1 | 6/2014 | Doerr |
| 2014/0169392 A1 | 6/2014 | Kim |
| 2014/0211298 A1 | 7/2014 | Sayyah et al. |
| 2014/0332918 A1 | 11/2014 | Li et al. |
| 2014/0376000 A1 | 12/2014 | Swanson et al. |
| 2014/0376001 A1 | 12/2014 | Swanson |
| 2015/0055115 A1 | 2/2015 | Pedersen et al. |
| 2015/0056740 A1 | 2/2015 | Menezo |
| 2015/0109603 A1 | 4/2015 | Kim et al. |
| 2015/0171593 A1 | 6/2015 | Duan et al. |
| 2015/0177367 A1 | 6/2015 | Sebastian et al. |
| 2015/0177383 A1 | 6/2015 | Ruff et al. |
| 2015/0185244 A1 | 7/2015 | Inoue et al. |
| 2015/0207296 A1 | 7/2015 | Rickman et al. |
| 2015/0333480 A1 | 11/2015 | Santis et al. |
| 2015/0346340 A1 | 12/2015 | Yaacobi et al. |
| 2015/0378012 A1 | 12/2015 | Sayyah et al. |
| 2015/0378187 A1 | 12/2015 | Heck et al. |
| 2016/0084945 A1 | 3/2016 | Rodrigo et al. |
| 2016/0161600 A1 | 6/2016 | Eldada et al. |
| 2016/0170141 A1 | 6/2016 | Luo et al. |
| 2016/0209594 A1 | 7/2016 | Bahl |
| 2016/0223663 A1 | 8/2016 | Schmalenberg et al. |
| 2016/0261091 A1 | 9/2016 | Santis et al. |
| 2016/0274226 A1 | 9/2016 | Lewis |
| 2016/0290891 A1 | 10/2016 | Feng et al. |
| 2016/0291135 A1 | 10/2016 | Ando et al. |
| 2016/0299228 A1 | 10/2016 | Maleki et al. |
| 2016/0306043 A1 | 10/2016 | Moss et al. |
| 2016/0324438 A1 | 11/2016 | Halpern et al. |
| 2016/0341818 A1 | 11/2016 | Gilliland et al. |
| 2016/0373191 A1 | 12/2016 | Fathololoumi et al. |
| 2016/0377721 A1 | 12/2016 | Lardin et al. |
| 2017/0003451 A1 | 1/2017 | Ma et al. |
| 2017/0040775 A1 | 2/2017 | Takabayashi et al. |
| 2017/0059779 A1 | 3/2017 | Okayama |
| 2017/0067985 A1 | 3/2017 | Schwarz et al. |
| 2017/0098917 A1 | 4/2017 | Popovic et al. |
| 2017/0108649 A1 | 4/2017 | Dallesasse et al. |
| 2017/0139411 A1 | 5/2017 | Hartung et al. |
| 2017/0146639 A1 | 5/2017 | Carothers |
| 2017/0146641 A1 | 5/2017 | Walsh et al. |
| 2017/0153319 A1 | 6/2017 | Villeneuve et al. |
| 2017/0155225 A1 | 6/2017 | Villeneuve et al. |
| 2017/0184450 A1 | 6/2017 | Doylend et al. |
| 2017/0207600 A1 | 7/2017 | Klamkin et al. |
| 2017/0268866 A1 | 9/2017 | Berz |
| 2017/0269198 A1 | 9/2017 | Hall et al. |
| 2017/0269215 A1 | 9/2017 | Hall et al. |
| 2017/0299697 A1 | 10/2017 | Swanson |
| 2017/0307648 A1 | 10/2017 | Kotake et al. |
| 2017/0307736 A1 | 10/2017 | Omura |
| 2017/0328988 A1 | 11/2017 | Magee et al. |
| 2017/0343652 A1 | 11/2017 | de Mersseman et al. |
| 2017/0343791 A1 | 11/2017 | Swanson |
| 2017/0350965 A1 | 12/2017 | Schmalenberg |
| 2017/0350983 A1 | 12/2017 | Hall et al. |
| 2017/0356983 A1 | 12/2017 | Jeong et al. |
| 2017/0371227 A1 | 12/2017 | Skirlo et al. |
| 2017/0372602 A1 | 12/2017 | Gilliland et al. |
| 2018/0003805 A1 | 1/2018 | Popovich et al. |
| 2018/0024232 A1 | 1/2018 | Gilliland et al. |
| 2018/0024246 A1 | 1/2018 | Jeong et al. |
| 2018/0031680 A1 | 2/2018 | Lee et al. |
| 2018/0039154 A1 | 2/2018 | Hashemi et al. |
| 2018/0050704 A1 | 2/2018 | Tascione et al. |
| 2018/0073932 A1 | 3/2018 | Minet et al. |
| 2018/0088211 A1 | 3/2018 | Gill et al. |
| 2018/0095284 A1 | 4/2018 | Welch et al. |
| 2018/0102442 A1 | 4/2018 | Wang et al. |
| 2018/0103431 A1 | 4/2018 | Suh et al. |
| 2018/0113216 A1 | 4/2018 | Kremer et al. |
| 2018/0120433 A1 | 5/2018 | Eichenholz et al. |
| 2018/0120436 A1 | 5/2018 | Smits |
| 2018/0136321 A1 | 5/2018 | Verghese et al. |
| 2018/0143322 A1 | 5/2018 | Rosenzweig et al. |
| 2018/0143374 A1 | 5/2018 | Coolbaugh et al. |
| 2018/0149752 A1 | 5/2018 | Tadano |
| 2018/0164408 A1 | 6/2018 | Hall et al. |
| 2018/0172918 A1 | 6/2018 | Lane et al. |
| 2018/0188371 A1 | 7/2018 | Bao et al. |
| 2018/0217471 A1 | 8/2018 | Lee et al. |
| 2018/0224547 A1 | 8/2018 | Crouch et al. |
| 2018/0231643 A1 | 8/2018 | Lee et al. |
| 2018/0269890 A1 | 9/2018 | Ojeda |
| 2018/0287343 A1 | 10/2018 | Morrison et al. |
| 2018/0306925 A1 | 10/2018 | Hosseini et al. |
| 2018/0329037 A1 | 11/2018 | Bozchalooi et al. |
| 2018/0351317 A1 | 12/2018 | Vermeulen |
| 2018/0356344 A1 | 12/2018 | Yi |
| 2018/0356522 A1 | 12/2018 | Kikuchi et al. |
| 2018/0359033 A1 | 12/2018 | Xu et al. |
| 2018/0364334 A1 | 12/2018 | Xiang et al. |
| 2018/0364336 A1 | 12/2018 | Hosseini et al. |
| 2018/0372517 A1 | 12/2018 | Yao et al. |
| 2018/0372530 A1 | 12/2018 | Welle et al. |
| 2018/0372870 A1 | 12/2018 | Puglia |
| 2018/0375284 A1 | 12/2018 | Permogorov |
| 2019/0004151 A1 | 1/2019 | Abediasl et al. |
| 2019/0011558 A1 | 1/2019 | Crouch et al. |
| 2019/0011559 A1 | 1/2019 | Desai et al. |
| 2019/0018110 A1 | 1/2019 | Kremer et al. |
| 2019/0018121 A1 | 1/2019 | Sayyah et al. |
| 2019/0018139 A1 | 1/2019 | Sayyah et al. |
| 2019/0018140 A1 | 1/2019 | Sarkissian |
| 2019/0018197 A1 | 1/2019 | Boutami et al. |
| 2019/0025094 A1 | 1/2019 | Lewis et al. |
| 2019/0025426 A1 | 1/2019 | Satyan et al. |
| 2019/0025431 A1 | 1/2019 | Satyan et al. |
| 2019/0027897 A1 | 1/2019 | Wei et al. |
| 2019/0033453 A1 | 1/2019 | Crouch et al. |
| 2019/0049569 A1 | 2/2019 | Kim et al. |
| 2019/0064329 A1 | 2/2019 | Liu et al. |
| 2019/0064332 A1 | 2/2019 | Schmalenberg et al. |
| 2019/0064358 A1 | 2/2019 | Desai et al. |
| 2019/0072651 A1 | 3/2019 | Halmos et al. |
| 2019/0072672 A1 | 3/2019 | Yao |
| 2019/0086514 A1 | 3/2019 | Dussan et al. |
| 2019/0086518 A1 | 3/2019 | Halstig et al. |
| 2019/0086550 A1 | 3/2019 | Dussan et al. |
| 2019/0096259 A1 | 3/2019 | McQuillen et al. |
| 2019/0101647 A1 | 4/2019 | Feshali et al. |
| 2019/0107623 A1 | 4/2019 | Campbell et al. |
| 2019/0120939 A1 | 4/2019 | O'Keeffe |
| 2019/0146074 A1 | 5/2019 | Hjelmstad |
| 2019/0154832 A1 | 5/2019 | Maleki et al. |
| 2019/0154835 A1 | 5/2019 | Maleki et al. |
| 2019/0179012 A1 | 6/2019 | Heo |
| 2019/0187269 A1 | 6/2019 | Tong et al. |
| 2019/0204419 A1 | 7/2019 | Baba et al. |
| 2019/0204441 A1 | 7/2019 | Feneyrou et al. |
| 2019/0204443 A1 | 7/2019 | Yao et al. |
| 2019/0250253 A1 | 8/2019 | Hung et al. |
| 2019/0250396 A1 | 8/2019 | Blanche et al. |
| 2019/0257924 A1 | 8/2019 | Li et al. |
| 2019/0257927 A1 | 8/2019 | Yao |
| 2019/0280453 A1 | 9/2019 | Gopinath et al. |
| 2019/0293794 A1 | 9/2019 | Zhang et al. |
| 2019/0302262 A1 | 10/2019 | Singer |
| 2019/0310372 A1 | 10/2019 | Crouch et al. |
| 2019/0310377 A1 | 10/2019 | Lodin et al. |
| 2019/0317195 A1 | 10/2019 | Sun et al. |
| 2019/0331797 A1 | 10/2019 | Singer et al. |
| 2019/0339388 A1 | 11/2019 | Crouch et al. |
| 2019/0339389 A1 | 11/2019 | Russo et al. |

(56) References Cited

U.S. PATENT DOCUMENTS

| | | |
|---|---|---|
| 2019/0341739 A1 | 11/2019 | Loh et al. |
| 2019/0346056 A1 | 11/2019 | Staiger et al. |
| 2019/0346568 A1 | 11/2019 | Feng et al. |
| 2019/0353787 A1 | 11/2019 | Petit |
| 2019/0353789 A1 | 11/2019 | Boloorian et al. |
| 2019/0353977 A1 | 11/2019 | Hung |
| 2019/0361122 A1 | 11/2019 | Crouch et al. |
| 2019/0369244 A1 | 12/2019 | Asghari et al. |
| 2019/0369251 A1 | 12/2019 | Feng et al. |
| 2019/0372307 A1 | 12/2019 | Morton |
| 2019/0383907 A1 | 12/2019 | Belsley et al. |
| 2019/0391242 A1 | 12/2019 | Asghari et al. |
| 2019/0391243 A1* | 12/2019 | Nicolaescu .............. G01S 17/42 |
| 2020/0007279 A1 | 1/2020 | Chen et al. |
| 2020/0018857 A1 | 1/2020 | Feng et al. |
| 2020/0021082 A1 | 1/2020 | Rakuljic |
| 2020/0025898 A1 | 1/2020 | Ain-Kedem et al. |
| 2020/0025926 A1 | 1/2020 | Asghari et al. |
| 2020/0043176 A1 | 2/2020 | Maila et al. |
| 2020/0049799 A1 | 2/2020 | Ando et al. |
| 2020/0057143 A1 | 2/2020 | Asghari et al. |
| 2020/0064116 A1 | 2/2020 | Salvade et al. |
| 2020/0072978 A1 | 3/2020 | Boloorian et al. |
| 2020/0072979 A1 | 3/2020 | Boloorian et al. |
| 2020/0076152 A1 | 3/2020 | Eichenholz et al. |
| 2020/0088876 A1 | 3/2020 | Tanemura et al. |
| 2020/0103501 A1 | 4/2020 | Kotelnikov et al. |
| 2020/0104647 A1 | 4/2020 | Pirim |
| 2020/0110179 A1 | 4/2020 | Talty et al. |
| 2020/0116837 A1 | 4/2020 | Aghari et al. |
| 2020/0116842 A1 | 4/2020 | Aghari et al. |
| 2020/0142065 A1 | 5/2020 | Boloorian et al. |
| 2020/0142066 A1 | 5/2020 | Sandborn et al. |
| 2020/0142068 A1 | 5/2020 | Crouch et al. |
| 2020/0150241 A1 | 5/2020 | Byrnes et al. |
| 2020/0158830 A1 | 5/2020 | Asghari et al. |
| 2020/0158833 A1 | 5/2020 | Baba et al. |
| 2020/0158839 A1 | 5/2020 | Lin et al. |
| 2020/0166617 A1 | 5/2020 | Crouch et al. |
| 2020/0166647 A1 | 5/2020 | Crouch et al. |
| 2020/0174095 A1 | 6/2020 | Altintas et al. |
| 2020/0182978 A1 | 6/2020 | Maleki et al. |
| 2020/0200879 A1 | 6/2020 | Halstig et al. |
| 2020/0209366 A1 | 7/2020 | Maleki |
| 2020/0225332 A1 | 7/2020 | Wagner et al. |
| 2020/0241119 A1 | 7/2020 | Asghari et al. |
| 2020/0249324 A1 | 8/2020 | Steinberg et al. |
| 2020/0249340 A1 | 8/2020 | Schmalenberg |
| 2020/0256956 A1 | 8/2020 | Luff et al. |
| 2020/0278432 A1 | 9/2020 | Thorpe et al. |
| 2020/0284879 A1 | 9/2020 | Asghari et al. |
| 2020/0284883 A1 | 9/2020 | Ferreira et al. |
| 2020/0284913 A1 | 9/2020 | Amelot et al. |
| 2020/0292706 A1 | 9/2020 | Hexsel et al. |
| 2020/0300980 A1 | 9/2020 | Behzadi et al. |
| 2020/0300993 A1 | 9/2020 | Behzadi et al. |
| 2020/0309949 A1 | 10/2020 | Feng et al. |
| 2020/0309952 A1 | 10/2020 | Imaki et al. |
| 2020/0319409 A1 | 10/2020 | Su et al. |
| 2020/0333441 A1 | 10/2020 | Diaz |
| 2020/0333443 A1 | 10/2020 | Boloorian et al. |
| 2020/0333533 A1 | 10/2020 | Rogers et al. |
| 2020/0363515 A1 | 11/2020 | Luff et al. |
| 2020/0400821 A1 | 12/2020 | Baker et al. |
| 2020/0400822 A1 | 12/2020 | Ando et al. |
| 2020/0408911 A1 | 12/2020 | Boloorian et al. |
| 2020/0408912 A1 | 12/2020 | Boloorian et al. |
| 2021/0010802 A1 | 1/2021 | Onohara et al. |
| 2021/0033732 A1 | 2/2021 | Boloorian et al. |
| 2021/0055388 A1 | 2/2021 | Feng et al. |
| 2021/0063541 A1 | 3/2021 | Zheng et al. |
| 2021/0063542 A1 | 3/2021 | Zheng et al. |
| 2021/0072385 A1* | 3/2021 | Sandborn .............. G01S 7/491 |
| 2021/0072389 A1 | 3/2021 | Boloorian et al. |
| 2021/0072445 A1 | 3/2021 | Kurokawa et al. |
| 2021/0096228 A1 | 4/2021 | Behzadi et al. |
| 2021/0109195 A1 | 4/2021 | Feng et al. |
| 2021/0116778 A1 | 4/2021 | Zhang et al. |
| 2021/0132232 A1 | 5/2021 | Asghari et al. |
| 2021/0141058 A1 | 5/2021 | Piggott et al. |
| 2021/0149056 A1 | 5/2021 | Luff et al. |
| 2021/0156999 A1 | 5/2021 | Nishino et al. |
| 2021/0159659 A1 | 5/2021 | Bandyopadhyay et al. |
| 2021/0159664 A1 | 5/2021 | Liu et al. |
| 2021/0165102 A1 | 6/2021 | Crouch et al. |
| 2021/0173058 A1 | 6/2021 | Viswanatha et al. |
| 2021/0181320 A1 | 6/2021 | Oza et al. |
| 2021/0190907 A1 | 6/2021 | Sahara |
| 2021/0190925 A1 | 6/2021 | Asghari et al. |
| 2021/0199797 A1 | 7/2021 | Choi et al. |
| 2021/0239811 A1 | 8/2021 | Asghari et al. |
| 2021/0255324 A1 | 8/2021 | Dunn et al. |
| 2021/0278540 A1 | 9/2021 | Maayan et al. |
| 2021/0293923 A1 | 9/2021 | Arkind et al. |
| 2021/0318436 A1 | 10/2021 | Boloorian et al. |
| 2021/0325520 A1 | 10/2021 | Cai et al. |
| 2021/0333386 A1 | 10/2021 | Park et al. |
| 2021/0349196 A1 | 11/2021 | Wang et al. |
| 2021/0349216 A1 | 11/2021 | Behroozpour et al. |
| 2021/0356592 A1 | 11/2021 | Behroozpour |
| 2021/0373162 A1 | 12/2021 | Wu et al. |
| 2021/0389244 A1 | 12/2021 | Bowman et al. |
| 2021/0396879 A1 | 12/2021 | Sun et al. |
| 2021/0405194 A1 | 12/2021 | Tsuchida |
| 2022/0003842 A1 | 1/2022 | Wang et al. |
| 2022/0050187 A1 | 2/2022 | Yao |
| 2022/0065999 A1 | 3/2022 | Phare et al. |
| 2022/0075121 A1 | 3/2022 | Lowder et al. |
| 2022/0085567 A1 | 3/2022 | Lowder et al. |
| 2022/0099837 A1 | 3/2022 | Crouch et al. |
| 2022/0107411 A1 | 4/2022 | Koonath et al. |
| 2022/0113422 A1 | 4/2022 | Hillard et al. |
| 2022/0121080 A1 | 4/2022 | Yao |
| 2022/0179055 A1 | 6/2022 | Ferrara et al. |
| 2022/0187457 A1 | 6/2022 | Daami et al. |
| 2022/0187458 A1 | 6/2022 | Piggott et al. |
| 2022/0187463 A1 | 6/2022 | Maheshwari et al. |
| 2022/0196814 A1 | 6/2022 | Lin et al. |
| 2022/0206164 A1 | 6/2022 | Takada |
| 2022/0244360 A1 | 8/2022 | Phare et al. |
| 2022/0291361 A1 | 9/2022 | Asghari et al. |
| 2022/0308192 A1 | 9/2022 | John et al. |
| 2022/0334225 A1 | 10/2022 | Davydenko et al. |
| 2022/0342048 A1 | 10/2022 | Asghari et al. |
| 2022/0365214 A1 | 11/2022 | Sandborn et al. |
| 2022/0373667 A1 | 11/2022 | Khatana et al. |
| 2022/0404470 A1 | 12/2022 | Asghari et al. |
| 2022/0413100 A1 | 12/2022 | Jain |
| 2022/0413143 A1 | 12/2022 | Parsa et al. |
| 2023/0027271 A1 | 1/2023 | Jin et al. |
| 2023/0069201 A1 | 3/2023 | Asghari et al. |
| 2023/0104453 A1 | 4/2023 | Asghari et al. |
| 2023/0228878 A1 | 7/2023 | Asghari et al. |
| 2023/0288566 A1 | 9/2023 | Nadkarni et al. |
| 2023/0296732 A1 | 9/2023 | Xiao |

FOREIGN PATENT DOCUMENTS

| | | |
|---|---|---|
| CN | 103874945 A | 6/2014 |
| CN | 105589074 A | 5/2016 |
| CN | 105917257 A | 8/2016 |
| CN | 106154248 A | 11/2016 |
| CN | 106410607 A | 2/2017 |
| CN | 106773028 A | 5/2017 |
| CN | 107144847 A | 9/2017 |
| CN | 107305184 A | 10/2017 |
| CN | 107367734 A | 11/2017 |
| CN | 107976666 A | 5/2018 |
| CN | 106842232 A | 6/2018 |
| CN | 2018139465 A | 6/2018 |
| CN | 108291970 A | 7/2018 |
| CN | 108603758 A | 9/2018 |
| CN | 109642952 A | 4/2019 |
| CN | 110036276 A | 7/2019 |

(56) References Cited

FOREIGN PATENT DOCUMENTS

| | | |
|---|---|---|
| CN | 107192355 B | 8/2019 |
| CN | 110161516 A | 8/2019 |
| CN | 110187350 A | 8/2019 |
| CN | 110412685 A | 11/2019 |
| CN | 111338025 A | 6/2020 |
| CN | 112241014 A | 1/2021 |
| DE | 10 2015 222061 A1 | 5/2017 |
| DE | 10 2017 200795 A1 | 7/2018 |
| DE | 102019124598 A1 | 3/2020 |
| EP | 2796890 A1 | 10/2014 |
| EP | 2955542 B1 | 4/2017 |
| EP | 3 276 371 A1 | 1/2018 |
| EP | 3339924 A1 | 6/2018 |
| EP | 3259615 B1 | 11/2019 |
| EP | 3529615 B1 | 11/2019 |
| EP | 3889644 A1 | 10/2021 |
| GB | 1 585 053 A | 2/1981 |
| GB | 2173664 A | 10/1986 |
| JP | H1010227 A | 1/1998 |
| JP | 2003224321 A | 8/2003 |
| JP | 2007184511 A | 7/2007 |
| JP | 2008160130 A | 7/2007 |
| JP | 2008292370 A | 12/2008 |
| JP | 2009-115696 A | 5/2009 |
| JP | 2010151806 A | 7/2010 |
| JP | 2015180735 A | 10/2010 |
| JP | 2010271624 A | 12/2010 |
| JP | 2015230259 A | 12/2010 |
| JP | 2014202716 A | 10/2014 |
| JP | 2015-018640 A | 1/2015 |
| JP | 2015092184 A | 5/2015 |
| JP | 2015172540 A | 10/2015 |
| JP | 5975203 B2 | 8/2016 |
| JP | 2017097340 A | 6/2017 |
| JP | 2017106897 A | 6/2017 |
| JP | 2017524918 A | 8/2017 |
| JP | 2017161484 A | 9/2017 |
| JP | 2017-198514 A | 11/2017 |
| JP | 2017-211348 A | 11/2017 |
| JP | 2018-512600 A | 5/2018 |
| JP | 2018520346 A | 7/2018 |
| JP | 20188529955 A | 10/2018 |
| JP | 2018188284 A | 11/2018 |
| JP | 2018200273 A | 12/2018 |
| JP | 2019502925 A | 1/2019 |
| JP | 2019095218 A | 6/2019 |
| JP | 2019-537012 A | 12/2019 |
| JP | 2020-34546 A | 3/2020 |
| JP | 2002090457 A | 3/2020 |
| JP | 2020085723 A | 6/2020 |
| JP | 2021004800 A | 1/2021 |
| JP | 2021032848 A | 3/2021 |
| JP | 7397009 A | 12/2023 |
| KR | 20060086182 A | 7/2006 |
| KR | 10-2015-0045735 A | 4/2015 |
| KR | 20180013598 A | 2/2018 |
| KR | 101 931 022 B1 | 12/2018 |
| WO | 97/11396 A1 | 3/1997 |
| WO | 2010123182 A1 | 10/2010 |
| WO | 2010127151 A1 | 11/2010 |
| WO | 2012123668 A1 | 9/2012 |
| WO | 2012153309 A2 | 11/2012 |
| WO | 2014/203654 A1 | 12/2014 |
| WO | 2015/044370 A1 | 4/2015 |
| WO | 2015/058209 A1 | 4/2015 |
| WO | 2015/098027 A1 | 7/2015 |
| WO | 2015/200800 A1 | 12/2015 |
| WO | 2016/097409 A2 | 6/2016 |
| WO | 2017/023107 A1 | 2/2017 |
| WO | 2017/083597 A1 | 5/2017 |
| WO | 2017/095817 A1 | 6/2017 |
| WO | 2017-102156 A1 | 6/2017 |
| WO | 2017/216581 A1 | 12/2017 |
| WO | 2018/003852 A1 | 1/2018 |
| WO | 2018/036946 A1 | 3/2018 |
| WO | 2018/060318 A1 | 4/2018 |
| WO | 2018/116412 A1 | 6/2018 |
| WO | 2018/160240 A2 | 9/2018 |
| WO | 2018/230474 A1 | 12/2018 |
| WO | 2019/010320 A1 | 1/2019 |
| WO | 2019/018894 A1 | 1/2019 |
| WO | 2019/121069 A1 | 6/2019 |
| WO | 2019/130472 A1 | 7/2019 |
| WO | 2019196135 A1 | 10/2019 |
| WO | 2019/217761 A1 | 11/2019 |
| WO | 2019/217857 A1 | 11/2019 |
| WO | 2019/236430 A1 | 12/2019 |
| WO | 2019/0236464 A1 | 12/2019 |
| WO | 2020/005537 A1 | 1/2020 |
| WO | 2020/033161 A1 | 2/2020 |
| WO | 2020/046513 A1 | 3/2020 |
| WO | 2020/110779 A1 | 6/2020 |
| WO | 2020/129284 A1 | 6/2020 |
| WO | 2020/234797 A1 | 11/2020 |
| WO | 2020/251633 A1 | 12/2020 |
| WO | 2021/024038 A1 | 2/2021 |
| WO | 2021/252894 A1 | 12/2021 |
| WO | 2022/013422 A1 | 1/2022 |
| WO | 2022/233503 A1 | 11/2022 |
| WO | 2023/118295 A1 | 6/2023 |

OTHER PUBLICATIONS

Kang, Sung Chul, International Search Report and Written Opinion, PCT/US2019/036604, Korean Intellectual Property Office, Oct. 16, 2019.

Sandborn, P.A.M., "FMCW Lidar: Scaling to the Chip-Level and Improving Phase-Noise-Limited Performance," University of California, Berkeley, Fall 2017, 18 pp.

Tang, Xiaofan, International Preliminary Report on Patentability and Written Opinion, PCT/US2019/036604, The International Bureau of WIPO, Jan. 7, 2021.

Velodyne, HDL-64E S2 Datasheet, Retrieved from http://velodynelidar.com/lidar/products/brochure/HDL-64E%20S2%datasheet_2010_lowres.pdf, 2017.

Kajita, Shinya, Office Action, Patent Application No. 2020-571353, Japan Patent Office, Mar. 24, 2023.

Aalto, Timo Eta L., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.

Anderson et al., "ladar: Frequency-Modulated Continuous Wave Laser Detection And Ranging", Photogrammetric Engineering & Remote Sensing, vol. 83, No. 11, Nov. 2017.

Baghmisheh, B. B., "Chip-scale Lidar", Jan. 19, 2017, Electrical Engineering and Computer Sciences University of California, Berkeley.

Behroozpour et al., "Electronic-Photonic Integrated Circulator 3D Microimaging", IEEE Journal of Solid-State Circuits, Jan. 2017, vol. 52, No. 1, pp. 161-172.

Behroozpour, B. et al., "Lidar System Architectures and Circuits," IEEE Communications Magazine, Oct. 2017, pp. 135-142.

Carter et al., "Lidar 101: An Introduction to Lidar Technology, Data, and Applications", Nov. 2012, NOAA Coastal Services Center, 76 pages.

Chan, M.K, "Atmospheric transmission windows for high energy short pulse lasers", Thesis, Naval Postgraduate School, Dec. 2003.

Conditional Euclidean Clustering, retrieved on Jul. 9, 2022 from https://pcl.readthedocs.io/projects/tutorials/en/latest/cluster_extraction.html#cluster-extraction.

Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29-May 3, 2013, Baltimore, Maryland, vol. 8734, Active and Passive Signatures, 9 pages.

Day, I.E., et al. "Solid state absorption attenuator in silicon-on-insulator with MHz bandwidth.", Integrated Photonics Research

(56) References Cited

OTHER PUBLICATIONS

2002, Vancouver, Canada, Jul. 17-19, 2002 (Optica Publishing Group, 2002), paper IFA5, 3 pages.

Doylend, J. K., "Two-dimensional free-space beam steering with an optical phased array on silicon-on-insulator", Oct. 1, 2011, Optics Express, 19(22), 21595-2160.

Euclidean Cluster Extraction, retrieved on Jul. 9, 2022 from https://pcl.readthedocs.io/projects/tutorials/en/latest/conditional_euclidean_clustering.html.

Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.

Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.

Goodman, J., "Speckle Phenomena in Optics Theory and Applications", Roberts and Company, Sep. 28, 2007, 130(2), pp. 413-414.

Gulati, et al., "A Low-Power Reconfigurable Analog-to-Digital Converter", IEEE Journal of Solid-State Circuits, Dec. 2001, vol. 36, No. 12, pp. 1900-1911.

Guo et al., "Beat-frequency adjustable Er3+-doped DBR fiber laser for ultrasound detection", Optics Express, Jan. 31, 2011, vol. 19, No. 3, pp. 2485-2492.

Haran, T., "Short-wave infrared diffuse reflectance of Textile Materials", Thesis, Georgia State University, 2008.

Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.

Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.

Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.

Kaasalainen, S., "The multispectral journey of Lidar", Retrieved from GIM International: https://www.gim-international.com/content/article/the-multispectral-journey-of-lidar, Jan. 24, 2019.

Kelly et al., "Discrete mode laser diodes with ultra narrow linewidthe emission" Feb. 2007, Electronics Letters, vol. 43, 2 pgs.

Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.

Komljenovic et al., "Widely-Tunable Ring-Resonator Semiconductor Lasers", Review, Jul. 17, 2017, 21 pages.

Kotthaus, S., et al., "Derivation of an urban materials spectral library through emittance and reflectance spectroscopy", ISPRS Journal of Photogrammetry and Remote Sensing, Aug. 2014, vol. 94, 194-212.

Kumar et al., "Intra-data center interconnects, networking, and architectures", Coherent Detection, Optical Fiber Telecommunications VII, Oct. 25, 2019, Science Direct, pp. 627-672.

Li, L., "Time-of-Flight Camera—An Introduction", 2014, TI Technical White Paper, SLOA190B.

Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.

Lu, Z., "Silicon Photonic Switches for Optical Communication Applications", PHD Thesis. University of British Columbia, Sep. 29, 2017, 165 pages.

PDB450C—Switchable Gain Balanced Amp. Photodetector, InGaAs. (n.d.). Retrieved from Thorlabs: https://www.thorlabs.com/thorproduct.cfm?partnumber=PDB450C.

Pfennigbauer, M. et al., "Multi-Wavelength Airborne Laser Scanning", ILMF 2011. New Orleans, Feb. 7-9, 2011.

PI Motion/Positioning, 2018, Retrieved from Pi USA: http://www.pi-usa.us/products/PDF_Data/Q-522_Mini_Positioning_Stage_20150203.pdf.

PI USA: Fast Tip/Tilt Platform, 2018, Retrieved from PI USA Active Optics: http://www.pi-usa.us/products/PDF_Data/S335_Fast_Tip-Tilt_Platform.pdf.

Pierrottet et al., "Linear FMCW Laser Radar for Precision Range and Vector Velocity Measurements", MRS Online Proceeding Library Archive, Jan. 2008, pp. 1-9.

Pilot Photonics, Lyra OCS 1000, Optical comb laser module, Retrieved on Nov. 20, 2019 from Pilot Photonics: http://www.pilotphotonics.com/optical-frequency-comb-source/.

Poulton, C. V. MSC Thesis, "Integrated LIDAR with Optical Phased Arrays in Silicon Photonics", Massachusetts Institute of Technology, Sep. 2016, pp. 95-101.

Poulton, Christopher V. et al., "Coherent Solid-State LIDAR with Silicon Photonic Optical Phased Arrays", pp. 4091-4094, Oct. 15, 2017, Optics Letters, vol. 42, No. 20.

Rablau, "LIDAR—A new (self-driving) vehicle for introducing optics to broader engineering and non-engineering audiences", in Fifteenth Conference on Education and Training in Optics and Photonics 2019, May 21-24, 2019, Quebec City, Quebec, Optica Publishing Group 2019, Paper 11143_138 (14 pages).

Royo et al., "An Overview of LIDAR Imaging Systems for Autonomous Vehicles", Appl. Sci., Sep. 30, 2019, 9 (19):4093, 37 pages. https://doi.org/10.3390/app9194093.

Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.

Satyan, N. et al., "Precise control of broadband frequency chirps using optoelectronic feedback," Optics Express, Aug. 31, 2009, vol. 17, No. 18, pp. 15991-15999.

Schulmeister, Karl, "White Paper The new edition of the international laser product safety standard", IEC 60825-1, 2014.

Self, "Focusing of spherical Gaussian beams", Applied Optics, Mar. 1, 1983, vol. 22, No. 5, pp. 658-661.

Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.

Smit, Meint K. C. v., "Phasar-Based WDM-Devices: Principles, Design and Applications", IEEE Journal of Selected Topics in Quantum Electronics, Jan. 1, 1996, 2(2), 236-250.

Soref, Richard A. et al. "Electrooptical Effects in Silicon", IEEE Journal of Quantum Electronics, vol. QE-23, No. 1, Jan. 1987, pp. 123-129.

Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.

Sun, J., et al., "Large-scale silicon photonic circuits for optical phased arrays," vol. 20, No. 4, Jul./Aug. 2014. IEEE Journal of Selected Topics in Quantum Electronics.

"The Demultiplexer" accessed from www.electronics-tutorials.ws/combination/comb_3.html with WayBack Machine dated Feb. 9, 2008, 2 pages.

Van Acoleyen et al., "Off-chip beam steering with a one-dimensional optical phased array on silicon-on-insulator", Apr. 2009, Opt. Lett., 34(9) 1477-1479.

Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.

Vasilyev, A. et al., "The Optoelectronic Swept-Frequency Laser and Its Applications in Ranging, Three-Dimensional Imaging, and Coherent Beam Combining of Chirped-Seed Amplifiers," CaltechTHESIS, May 20, 2013, 177 pages.

Wang et al., "Automotive FMCW Radar-enhanced Range Estimation via a Local Resampling Fourier Transform", International Journal of Advanced Robotic Systems, May 15, 2016, pp. 1-8.

Wikipedia, Optical Attenuator, 2022, 3 pages.

Wojtkiewicz et al., "Two-dimensional signal processing in FMCW radars", National Conference on Circuit Theory and Electronic Networks, vol. 2, Oct. 1997, pp. 1-6.

(56) References Cited

OTHER PUBLICATIONS

Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.

Zhu et al., "Dual-Comb Ranging", Engineering, 4, Oct. 16, 2018, pp. 772-778.

* cited by examiner

OPTICAL SWITCHING FOR TUNING DIRECTION OF LIDAR OUTPUT SIGNALS

RELATED APPLICATIONS

This Patent Application is a Divisional of U.S. patent application Ser. No. 16/277,790, filed on Feb. 15, 2019, entitled "Optical Switching for Tuning Direction of LIDAR Output Signals" and incorporated herein in its entirety; and U.S. patent application Ser. No. 16/277,790 claims the benefit of U.S. Provisional Patent Application Ser. No. 62/689,716, filed on Jun. 25, 2018, entitled "Optical Sensor System" and incorporated herein in its entirety.

FIELD

The invention relates to optical devices. In particular, the invention relates to LIDAR chips.

BACKGROUND

There is an increasing commercial demand for 3D sensing systems that can be economically deployed in applications such as ADAS (Advanced Driver Assistance Systems) and AR (Augmented Reality). LIDAR (Light Detection and Ranging) sensors are used to construct a 3D image of a target scene by illuminating the scene with laser light and measuring the returned signal.

Frequency Modulated Continuous Wave (FMCW) is an example of a coherent detection method can be used for LIDAR applications. The FMCW technique is capable of determining both distance and velocity of an object with a single measurement. Additionally, FMCW techniques have reduced sensitivity to ambient light and light from other LIDAR systems.

For many LIDAR applications there is a need to scan the light beam externally to build up an image of the field of view. Methods of scanning the beam include mechanical methods such as rotating the assembly containing the lasers, rotating mechanical mirrors, and MEMS mirrors. 'Solid-state' approaches are of interest due to their lack of moving parts and may improve scanning speeds. However, the solid-state approaches that have been tried have limited angular ranges and require a large number of control elements. As a result, there is a need for a practical solid-state scanning mechanism.

SUMMARY

An optical system has a LIDAR chip that includes a switch configured to direct an outgoing LIDAR signal to one of multiple different alternate waveguides. The system also includes a redirection component configured to receive the outgoing LIDAR signal from any one of the alternate waveguides. The redirection component is also configured to redirect the received outgoing LIDAR signal such that a direction that the outgoing LIDAR signal travels away from the redirection component is a function of the alternate waveguide from which the redirection component receives the outgoing LIDAR signal.

DESCRIPTION

Figure 1:
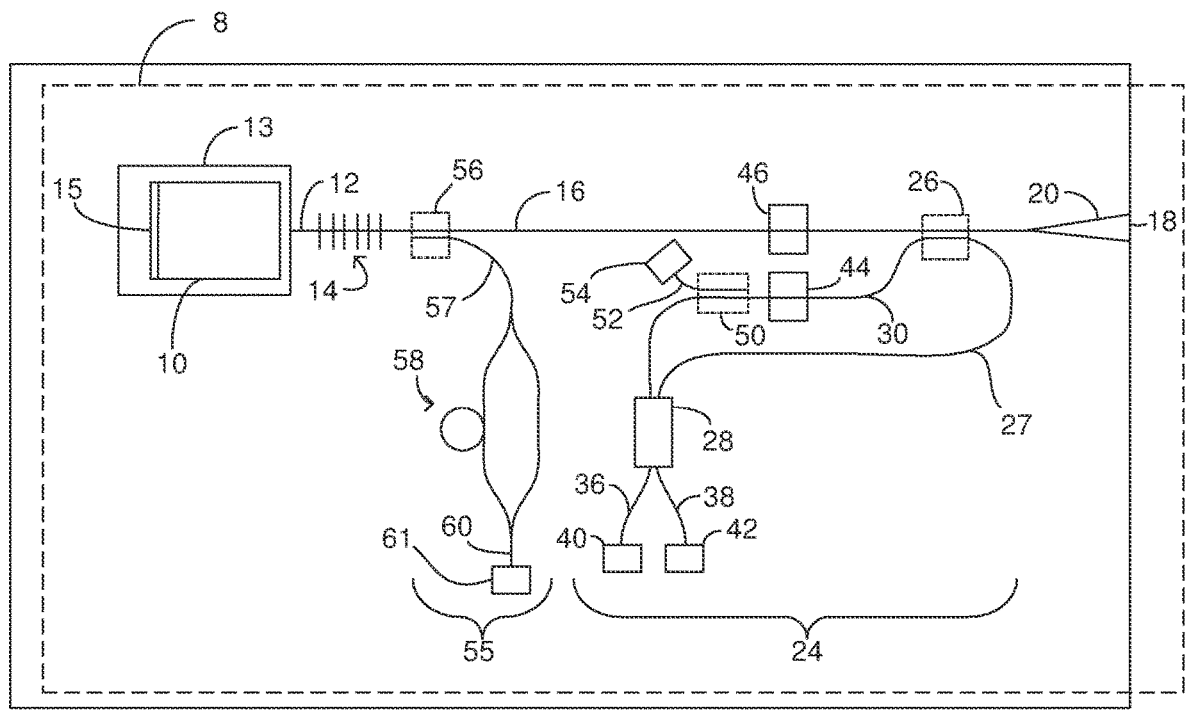
FIG. 1 is a top view of a LIDAR chip.

A LIDAR system has a LIDAR chip that includes a switch configured to direct an outgoing LIDAR signal to any one of multiple different alternate waveguides. A redirection component receives the outgoing LIDAR signal from any one of the alternate waveguides. The redirection component also redirects the received outgoing LIDAR signal such that a direction that the outgoing LIDAR signal travels away from the redirection component changes in response to changes in the alternate waveguide from which the redirection component receives the outgoing LIDAR signal. As a result, the outgoing LIDAR signal can be steered to different sample regions in a field of view by operating the optical switch so as to change the alternate waveguides to which the outgoing LIDAR signal is directed. The optical switch can be a solid-state optical switch that includes or consists of optical components such as cascaded 2×2 Mach-Zehnder (MZ) modulators interferometers. Additionally, an example of a suitable redirection component is one or more lenses and/or one or more mirrors. The one or more lenses and/or one or more mirrors can be stationary relative to the optical switch. As a result, steering of the outgoing LIDAR signal can be achieved with a practical solid-state device. Additionally, the angular range over which the outgoing LIDAR signal can be steered can be increased by increasing the separation between the alternate waveguides. As a result, the LIDAR system can have a solid-state steering mechanism with a wide angular range.

Another example of a suitable redirection component includes a splitter configured to receive the outgoing LIDAR signal from any one of the alternate waveguides and to split the outgoing LIDAR signal into output signals. The redirection component also includes multiple steering waveguides that are each configured to receive a different one of the output signals. The steering waveguides each terminates at a facet and the facets are arranged such that output signals exiting from the steering waveguides through the facets re-form the outgoing LIDAR signal with the re-formed outgoing LIDAR signal traveling away from the redirection component. At least a portion of the steering waveguides each includes a phase tuner configured to tune a phase differential between the output signals such the direction that the reformed outgoing LIDAR signal travels away from the redirection component changes. As a result, steering of the LIDAR output signal can be achieved with both the phase tuners and selection of the alternate waveguide. This combination of steering mechanisms allows the outgoing LIDAR signal to be steered continuously within a field of view. Additionally, the splitter, steering waveguides and phase tuners can all exclude moving parts. As a result, the steering of the outgoing LIDAR signal can be achieved with a practical solid-state device. Further, the angular range over which the outgoing LIDAR signal can be steered can be increased by increasing the separation between the alternate waveguides. As a result, the LIDAR system can have a solid-state steering mechanism with a wide angular range.

FIG. 1 is a topview of a LIDAR chip that includes a component assembly 8 with a laser cavity. The laser cavity includes a light source 10 that can include or consist of a gain medium (not shown) for a laser. The chip also includes a cavity waveguide 12 that receives a light signal from the light source 10. The light source can be positioned in a recess 13 so a facet of the light source is optically aligned with a facet of the cavity waveguide 12 to allow the light source and cavity waveguide 12 to exchange light signals. The cavity waveguide 12 carries the light signal to a partial return device 14. The illustrated partial return device 14 is an optical grating such as a Bragg grating. However, other partial return devices 14 can be used; for instance, mirrors can be used in conjunction with echelle gratings and arrayed waveguide gratings.

The partial return device 14 returns a return portion of the light signal to the cavity waveguide 12 as a return signal. For instance, the cavity waveguide 12 returns the return signal to the light source 10 such that the return portion of the light signal travels through the gain medium. The light source 10 is configured such that at least a portion of the return signal is added to the light signal that is received at the cavity waveguide 12. For instance, the light source 10 can include a highly, fully, or partially reflective device 15 that reflects the return signal received from the gain medium back into the gain medium. As a result, light can resonate between the partial return device 14 and the reflective device 15 so as to form a Distributed Bragg Reflector (DBR) laser cavity. A DBR laser cavity has an inherently narrow-linewidth and a longer coherence length than DFB lasers and accordingly improves performance when an object reflecting the LIDAR output signal from the chip is located further away from the chip.

The partial return device 14 passes a portion of the light signal received from the cavity waveguide 12 to a utility waveguide 16 included on the chip. The portion of the light signal that the utility waveguide 16 receives from the partial return device 14 serves as the output of the laser cavity. The output of the laser cavity serves as an outgoing LIDAR signal on the utility waveguide 16. The utility waveguide 16 terminates at a facet 18 and carries the outgoing LIDAR signal to the facet 18. The facet 18 can be positioned such that the outgoing LIDAR signal traveling through the facet 18 exits the chip and serves as a LIDAR output signal. For instance, the facet 18 can be positioned at an edge of the chip so the outgoing LIDAR signal traveling through the facet 18 exits the chip and serves as a LIDAR output signal.

The LIDAR output signal travels away from the chip and is reflected by objects in the path of the LIDAR signal. The reflected signal travels away from the objects. At least a portion of the reflected signal returns to the facet 18 of the utility waveguide 16. Accordingly, a portion of the reflected signal can enter the utility waveguide 16 through the facet 18 and serve as a LIDAR input signal guided by the utility waveguide 16.

The utility waveguide 16 can include a tapered portion before the facet 18. For instance, the utility waveguide 16 can include a taper 20 that terminate at the facet 18. The taper 20 can relax the alignment tolerances required for efficient coupling of the utility waveguide 16 to the LIDAR input light and the outgoing LIDAR signal. Accordingly, the taper 20 can increase the percentage of the LIDAR input signal that is successfully returned to the chip for processing. In some instances, the taper 20 is constructed such that the facet 18 has an area that is more than two, five, or ten times the area of a cross section of a straight portion of the utility waveguide 16. Although FIG. 1 shows the taper 20 as a horizontal taper, the taper 20 can be a horizontal and/or vertical taper. The horizontal and/or vertical taper can be linear and/or curved. In some instances, the taper 20 is an adiabatic taper.

The chip includes a data branch 24 where the optical signals that are processed for LIDAR data (radial velocity and/or distance between a reflecting object and the source of the LIDAR output signal) are generated. The data branch includes an optical coupler 26 that moves a portion of the light signals from the utility waveguide 16 into the data branch. For instance, an optical coupler 26 couples a portion of the outgoing LIDAR signal from the utility waveguide 16 onto a reference waveguide 27 as a reference signal. The reference waveguide 27 carries the reference signal to a light-combining component 28.

The optical coupler 26 also couples a portion of the LIDAR input signal from the utility waveguide 16 onto a comparative waveguide 30 as a comparative signal. The comparative signal includes at least a portion of the light from the LIDAR input signal. The comparative signal can exclude light from the reference light signal. The comparative waveguide 30 carries the comparative signal to the light-combining component 28.

The illustrated optical coupler 26 is a result of positioning the utility waveguide 16 sufficiently close to the reference waveguide 27 and the comparative waveguide 30 that light from the utility waveguide 16 is coupled into the reference waveguide 27 and the comparative waveguide 30; however, other signal tapping components can be used to move a portion of the of the light signals from the utility waveguide 16 onto the reference waveguide 27 and the comparative waveguide 30. Examples of suitable signal tapping components include, but are not limited to, y-junctions, multi-mode interference couplers (MMIs), and integrated optical circulators.

The light-combining component 28 combines the comparative signal and the reference signal into a composite signal. The reference signal includes light from the outgoing LIDAR signal. For instance, the reference signal can serve as a sample of the outgoing LIDAR signal. The reference signal can exclude light from the LIDAR output signal and the LIDAR input signal. In contrast, the comparative signal light includes light from the LIDAR input signal. For instance, the comparative signal can serve as a sample of the LIDAR input signal. Accordingly, the comparative signal has been reflected by an object located off of the chip while the LIDAR output signal has not been reflected. When the chip and the reflecting object are moving relative to one another, the comparative signal and the reference signal have different frequencies due to the Doppler effect. As a result, beating occurs between the comparative signal and the reference signal.

The light-combining component 28 also splits the resulting composite sample signal onto a first detector waveguide 36 and a second detector waveguide 38. The first detector waveguide 36 carries a first portion of the composite sample signal to a first light sensor 40 that converts the first portion of the composite sample signal to a first electrical signal. The second detector waveguide 38 carries a second portion of the composite sample signal to a second light sensor 42 that converts the second portion of the composite sample signal to a second electrical signal. Examples of suitable light sensors include germanium photodiodes (PDs), and avalanche photodiodes (APDs).

The light combining component 28, the first light sensor 40 and the second light sensor 42 can be connected as a balanced photodetector that outputs an electrical data signal. For instance, the light combining component 28, the first light sensor 40 and the second light sensor 42 can be connected such that the DC components of the signal photocurrents cancel, improving detection sensitivity. Suitable methods for connecting the first light sensor 40 and the second light sensor 42 as balanced photodetectors includes connecting the first light sensor 40 and the second light sensor 42 in series. In one example, the first light sensor 40 and the second light sensor 42 are both avalanche photodiodes connected in series. Balanced photodetection is desirable for detection of small signal fluctuations.

An example of a suitable light-combining component 28 is a Multi-Mode Interference (MMI) device such as a 2×2 MMI device. Other suitable light-combining components 28 include, but are not limited to, adiabatic splitters, and directional coupler. In some instances, the functions of the illustrated light-combining component 28 are performed by more than one optical component or a combination of optical components.

A single light sensor can replace the first light sensor 40 and the second light sensor 42 and can output the data signal. When a single light sensor replaces the first light sensor 40 and the second light sensor 42, the light-combining component 28 need not include light-splitting functionality. As a result, the illustrated light light-combining component 28 can be a 2×1 light-combining component rather than the illustrated 2×1 light-combining component. For instance, the illustrated light light-combining component can be a 2×1 MMI device. In these instances, the chip includes a single detector waveguide that carries the composite sample signal to the light sensor.

The data branch includes a data optical attenuator 44 positioned along the comparative waveguide 30 such that the data optical attenuator 44 can be operated so as to attenuate the comparative signal on the comparative waveguide 30. The chip also includes an output optical attenuator 46 positioned along the utility waveguide 16 such that the output optical attenuator 46 can be operated so as to attenuate the outgoing LIDAR signal on the utility waveguide 16. Suitable attenuators for the data optical attenuator 44 and/or the output optical attenuator 46 are configured to attenuate intensity of a light signal. Examples of a suitable attenuator configured to attenuate intensity of a light signal include carrier injection based PIN diodes, electro-absorption modulators, and Mach-Zehnder (MZ) modulators.

The chip also includes a sampling directional coupler 50 that couples a portion of the comparative signal from the comparative waveguide 30 onto a sampling waveguide 52. The coupled portion of the comparative signal serves as a sampling signal. The sampling waveguide 52 carries the sampling signal to a sampling light sensor 54. Although FIG. 1 illustrates a sampling directional coupler 50 moving a portion of the comparative signal onto the sampling waveguide 52, other signal tapping components can be used to move a portion of the comparative signal from the comparative waveguide 30 onto the sampling waveguide 52. Examples of suitable signal tapping components include, but are not limited to, y-junctions, and MMIs.

The chip includes a control branch 55 for controlling operation of the laser cavity. The control branch includes a directional coupler 56 that moves a portion of the outgoing LIDAR signal from the utility waveguide 16 onto a control waveguide 57. The coupled portion of the outgoing LIDAR signal serves as a tapped signal. Although FIG. 1 illustrates a directional coupler 56 moving portion of the outgoing LIDAR signal onto the control waveguide 57, other signal-tapping components can be used to move a portion of the outgoing LIDAR signal from the utility waveguide 16 onto the control waveguide 57. Examples of suitable signal tapping components include, but are not limited to, y-junctions, and MMIs.

The control waveguide 57 carries the tapped signal to an interferometer 58 that splits the tapped signal and then re-combines the different portions of the tapped signal with a phase differential between the portions of the tapped signal. The illustrated interferometer 58 is a Mach-Zehnder interferometer; however, other interferometers can be used.

The interferometer 58 outputs a control light signal on an interferometer waveguide 60. The interferometer waveguide 60 carries the control light signal to a control light sensor 61 that converts the control light signal to an electrical signal that serves as an electrical control signal. The interferometer signal has an intensity that is a function of the frequency of the outgoing LIDAR signal. For instance, a Mach-Zehnder interferometer will output a sinusoidal control light signal with a fringe pattern. Changes to the frequency of the outgoing LIDAR signal will cause changes to the frequency of the control light signal. Accordingly, the frequency of the electrical control signal output from the control light sensor 61 is a function of the frequency of the outgoing LIDAR signal. Other detection mechanisms can be used in place of the control light sensor 61. For instance, the control light sensor 61 can be replaced with a balanced photodetector arranged as the light combining component 28, the first light sensor 40 and the second light sensor 42.

Electronics 62 can operate one or more components on the chip. For instance, the electronics 62 can be in electrical communication with and control operation of the light source 10, the data optical attenuator 44, output optical attenuator 46, the first light sensor 40, the second light sensor 42, the sampling light sensor 54, and the control light sensor 61. Although the electronics 62 are shown off the chip, all or a portion of the electronics can be included on the chip. For instance, the chip can include electrical conductors that connect the first light sensor 40 in series with the second light sensor 42.

During operation of the chip, the electronics 62 operate the light source 10 such that the laser cavity outputs the outgoing LIDAR signal. The electronics 62 then operate the chip through a series of cycles where each cycle generates LIDAR data (radial velocity and/or distance between a reflecting object and the source of the LIDAR output signal) associated with one of the sample regions in the field of view. Each cycle can include multiple sample periods. During each sample period, the electronics can tune the frequency of the outgoing LIDAR signal. As will be described in more detail below, the electronics can employ output from the control branch in order to control the frequency of the outgoing LIDAR signal such that the frequency of the outgoing LIDAR signal as a function of time is known to the electronics. In some instance, a cycle includes a first sample period and a second sample period. During the first sample period, the electronics 62 can increase the frequency of the outgoing LIDAR signal and during the second sample period the electronics 62 can decrease the frequency of the outgoing LIDAR signal. For instance, the laser cavity can be configured to output an outgoing LIDAR signal (and accordingly a LIDAR output signal) with a wavelength of 1550 nm. During the first sample period, the electronics 62 can increase the frequency of the outgoing LIDAR signal (and accordingly a LIDAR output signal) such that the wavelength decreases from 1550 nm to 1459.98 nm followed by decreasing the frequency of the outgoing LIDAR signal such that the wavelength increases from 1459.98 nm to 1550 nm.

When the outgoing LIDAR signal frequency is increased during the first sample period, the LIDAR output signal travels away from the chip and then returns to the chip as a LIDAR input signal. A portion of the LIDAR input signal becomes the comparative signal. During the time that the LIDAR output signal and the LIDAR input signal are traveling between the chip and a reflecting object, the frequency of the outgoing LIDAR signal continues to increase. Since a portion of the outgoing LIDAR signal becomes the reference signal, the frequency of the reference signal continues to increase. As a result, the comparative signal enters the light-combining component with a lower frequency than the reference signal concurrently entering the light-combining component. Additionally, the further the reflecting object is located from the chip, the more the frequency of the reference signal increases before the LIDAR input signal returns to the chip. Accordingly, the larger the difference between the frequency of the comparative signal and the frequency of the reference signal, the further the reflecting object is from the chip. As a result, the difference between the frequency of the comparative signal and the frequency of the reference signal is a function of the distance between the chip and the reflecting object.

For the same reasons, when the outgoing LIDAR signal frequency is decreased during the second sample period, the comparative signal enters the light-combining component with a higher frequency than the reference signal concurrently entering the light-combining component and the difference between the frequency of the comparative signal and the frequency of the reference signal during the second sample is also function of the distance between the chip and the reflecting object.

In some instances, the difference between the frequency of the comparative signal and the frequency of the reference signal can also be a function of the Doppler effect because relative movement of the chip and reflecting object can also affect the frequency of the comparative signal. For instance, when the chip is moving toward or away from the reflecting object and/or the reflecting object is moving toward or away from the chip, the Doppler effect can affect the frequency of the comparative signal. Since the frequency of the comparative signal is a function of the speed the reflecting object is moving toward or away from the chip and/or the speed the chip is moving toward or away from the reflecting object, the difference between the frequency of the comparative signal and the frequency of the reference signal is also a function of the speed the reflecting object is moving toward or away from the chip and/or the speed the chip is moving toward or away from the reflecting object. Accordingly, the difference between the frequency of the comparative signal and the frequency of the reference signal is a function of the distance between the chip and the reflecting object and is also a function of the Doppler effect.

The composite sample signal and the data signal each effectively compares the comparative signal and the reference signal. For instance, since the light-combining component combines the comparative signal and the reference signal and these signals have different frequencies, there is beating between the comparative signal and reference signal. Accordingly, the composite sample signal and the data signal have a beat frequency related to the frequency difference between the comparative signal and the reference signal and the beat frequency can be used to determine the difference in the frequency of the comparative signal and the reference signal. A higher beat frequency for the composite sample signal and/or the data signal indicates a higher differential between the frequencies of the comparative signal and the reference signal. As a result, the beat frequency of the data signal is a function of the distance between the chip and the reflecting object and is also a function of the Doppler effect.

As noted above, the beat frequency is a function of two unknowns; the distance between the chip and the reflecting object and the relative velocity of the chip and the reflecting object (i.e., the contribution of the Doppler effect). The change in the frequency difference between the comparative signal and the reference signal ($\Delta f$) is given by $\Delta f = 2\Delta v f/c$ where f is the frequency of the LIDAR output signal and accordingly the reference signal, $\Delta v$ is the relative velocity of the chip and the reflecting object and c is the speed of light in air. The use of multiple different sample periods permits the electronics 62 to resolve the two unknowns. For instance, the beat frequency determined from the first sample period is related to the unknown distance and Doppler contribution and the beat frequency determined from the second sample period is also related to the unknown distance and Doppler contribution. The availability of the two relationships allows the electronics 62 to resolve the two unknowns. Accordingly, the distance between the chip and the reflecting object can be determined without influence from the Doppler effect. Further, in some instances, the electronics 62 use this distance in combination with the Doppler effect to determine the radial velocity of the reflecting object toward or away from the LIDAR chip.

In instances where the radial velocity of target and source is zero or very small, the contribution of the Doppler effect to the beat frequency is essentially zero. In these instances, the Doppler effect does not make a substantial contribution to the beat frequency and the electronics 62 can use only the beat frequency from the first sample period to determine the distance between the chip and the reflecting object.

During operation, the electronics 62 can adjust the frequency of the outgoing LIDAR signal in response to the electrical control signal output from the control light sensor 61. As noted above, the magnitude of the electrical control signal output from the control light sensor 61 is a function of the frequency of the outgoing LIDAR signal. Accordingly, the electronics 62 can adjust the frequency of the outgoing LIDAR signal in response to the magnitude of the control. For instance, while changing the frequency of the outgoing LIDAR signal during one of the sample periods, the electronics 62 can have a range of suitable values for the electrical control signal magnitude as a function of time. At multiple different times during a sample period, the electronics 62 can compare the electrical control signal magnitude to the range of values associated with the current time in the sample period. If the electrical control signal magnitude indicates that the frequency of the outgoing LIDAR signal is outside the associated range of electrical control signal magnitudes, the electronics 62 can operate the light source 10 so as to change the frequency of the outgoing LIDAR signal so it falls within the associated range. If the electrical control signal magnitude indicates that the frequency of the outgoing LIDAR signal is within the associated range of electrical control signal magnitudes, the electronics 62 do not change the frequency of the outgoing LIDAR signal.

During operation, the electronics 62 can adjust the level of attenuation provided by the output optical attenuator 46 in response to the sampling signal from the sampling light sensor 54. For instance, the electronics 62 operate the output optical attenuator 46 so as to increase the level of attenuation in response to the magnitude of the sampling signal being above a first signal threshold and/or decrease the magnitude of the power drop in response to the magnitude of the sampling signal being below a second signal threshold.

In some instance, the electronics 62 adjust the level of attenuation provided by the output optical attenuator 46 to prevent or reduce the effects of back-reflection on the performance of the laser cavity. For instance, the first signal threshold and/or the second signal threshold can optionally be selected to prevent or reduce the effects of back-reflection on the performance of the laser cavity. Back reflection occurs when a portion of the LIDAR input signal returns to the laser cavity as a returned LIDAR signal. In some instances, on the order of 50% of the LIDAR input signal that passes through the facet 18 returns to the laser cavity. The returned LIDAR signal can affect performance of the laser cavity when the power of the returned LIDAR signal entering the partial return device 14 does not decrease below the power of the outgoing LIDAR signal exiting from the partial return device 14 ("power drop") by more than a minimum power drop threshold. In the illustrated chip, the minimum power drop threshold can be around 35 dB (0.03%). Accordingly, the returned LIDAR signal can affect the performance of the laser cavity when the power of the returned LIDAR signal entering the partial return device 14 is not more than 35 dB below the power of the outgoing LIDAR signal exiting from the partial return device 14.

The electronics 62 can operate the output optical attenuator 46 so as to reduce the effect of low power drops, e.g. when the target object is very close or highly reflective or both. As is evident from FIG. 1, operation of the output optical attenuator 46 so as to increase the level of attenuation reduces the power of the returned LIDAR signal entering the partial return device 14 and also reduces the power of the returned outgoing LIDAR signal at a location away from the partial return device 14. Since the output optical attenuator 46 is located apart from the partial return device 14, the power of the outgoing LIDAR signal exiting from the partial return device 14 is not directly affected by the operation of the output optical attenuator 46. Accordingly, the operation of the output optical attenuator 46 so as to increase the level of attenuation increases the level of the power drop. As a result, the electronics can employ the optical attenuator 46 so as to tune the power drop.

Additionally, the magnitude of the sampling signal is related to the power drop. For instance, the magnitude of the sampling signal is related to the power of the comparative signal as is evident from FIG. 1. Since the comparative signal is a portion of the LIDAR input signal, the magnitude of the sampling signal is related to the power of the LIDAR input signal. This result means the magnitude of the sampling signal is also related to the power of the returned LIDAR signal because the returned LIDAR signal is a portion of the LIDAR input signal. Accordingly, the magnitude of the sampling signal is related to the power drop.

Since the magnitude of the sampling signal is related to the power drop, the electronics 62 can use the magnitude of the sampling signal to operate the output optical attenuator so as to keep the magnitude of the comparative signal power within a target range. For instance, the electronics 62 can operate the output optical attenuator 46 so as to increase the magnitude of the power drop in response to the sampling signal indicating that the magnitude of power drop is at or below a first threshold and/or the electronics 62 can operate the output optical attenuator 46 so as to decrease the magnitude of the power drop in response to the sampling signal indicating that the magnitude of power drop is at or above a second threshold. In some instances, the first threshold is greater than or equal to the minimum power drop threshold. In one example, the electronics 62 operate the output optical attenuator 46 so as to increase the magnitude of the power drop in response to the magnitude of the sampling signal being above a first signal threshold and/or decrease the magnitude of the power drop in response to the magnitude of the sampling signal being below a second signal threshold. The identification of the value(s) for one, two, three, or four variables selected from the group consisting of the first threshold, the second threshold, the first signal threshold, and the second signal threshold can be determined from calibration of the optical chip during set-up of the LIDAR chip system.

Light sensors can become saturated when the power of the composite light signal exceeds a power threshold. When a light sensor becomes saturated, the magnitude of the data signal hits a maximum value that does not increase despite additional increases in the power of the composite light signal above the power threshold. Accordingly, data can be lost when the power of the composite light signal exceeds a power threshold. During operation, the electronics 62 can adjust the level of attenuation provided by the data optical attenuator 44 so the power of the composite light signal is maintained below a power threshold.

As is evident from FIG. 1, the magnitude of the sampling signal is related to the power of the comparative signal. Accordingly, the electronics 62 can operate the data optical attenuator 44 in response to output from the sampling signal. For instance, the electronics 62 can operate the data optical attenuator so as to increase attenuation of the comparative signal when the magnitude of the sampling signal indicates the power of the comparative signal is above an upper comparative signal threshold and/or can operate the data optical attenuator so as to decrease attenuation of the comparative signal when the magnitude of the sampling signal indicates the power of the comparative signal is below a lower comparative signal threshold. For instance, in some instances, the electronics 62 can increase attenuation of the comparative signal when the magnitude of the sampling signal is at or above an upper comparative threshold and/or the electronics 62 decrease attenuation of the comparative signal when the magnitude of the sampling signal is at or below an upper comparative signal threshold.

Figure 2:
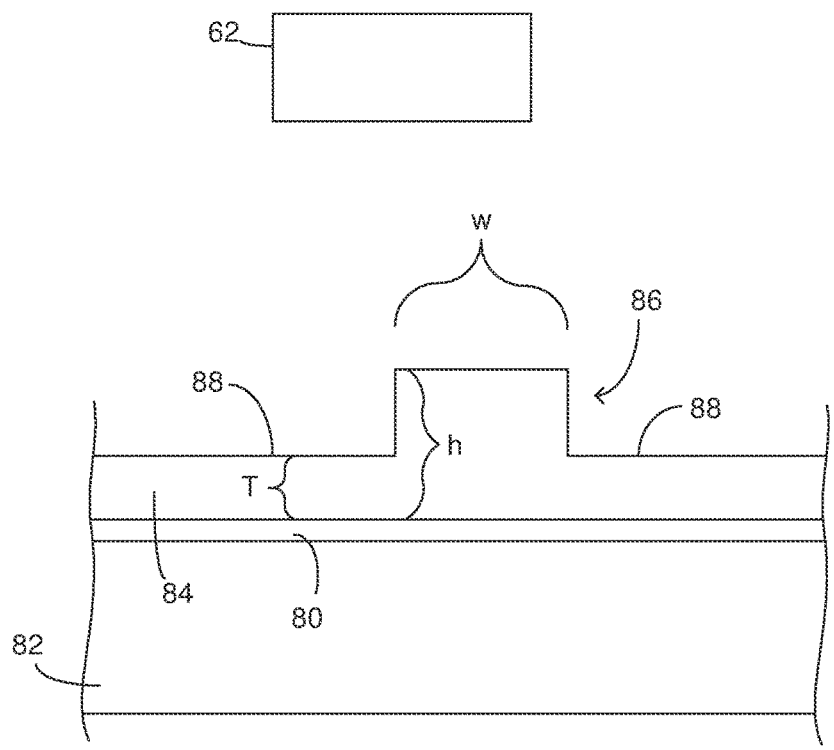
FIG. 2 is a cross-section of a LIDAR chip according to FIG. 1 constructed from a silicon-on-insulator wafer.

As noted above, the electronics 62 can adjust the level of attenuation provided by the output optical attenuator 46 in response to the sampling signal. The electronics 62 can adjust the level of attenuation provided by the data optical attenuator 44 in response to the sampling signal in addition or as an alternative to adjusting the level of attenuation provided by the output optical attenuator 46 in response to the sampling signal Suitable platforms for the chip include, but are not limited to, silica, indium phosphide, and silicon-on-insulator wafers. FIG. 2 is a cross-section of portion of a chip constructed from a silicon-on-insulator wafer. A silicon-on-insulator (SOI) wafer includes a buried layer 80 between a substrate 82 and a light-transmitting medium 84. In a silicon-on-insulator wafer, the buried layer is silica while the substrate and the light-transmitting medium are silicon. The substrate of an optical platform such as an SOI wafer can serve as the base for the entire chip. For instance, the optical components shown in FIG. 1 can be positioned on or over the top and/or lateral sides of the substrate.

The portion of the chip illustrated in FIG. 2 includes a waveguide construction that is suitable for use with chips constructed from silicon-on-insulator wafers. A ridge 86 of the light-transmitting medium extends away from slab regions 88 of the light-transmitting medium. The light signals are constrained between the top of the ridge and the buried oxide layer.

The dimensions of the ridge waveguide are labeled in FIG. 2. For instance, the ridge has a width labeled w and a height labeled h. A thickness of the slab regions is labeled T. For LIDAR applications, these dimensions are more important than other applications because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide while curved portions of the waveguide and/or tapered portions of the waveguide have dimensions outside of these ranges. For instance, the tapered portions of the utility waveguide 16 illustrated in FIG. 1 can have a width and/or height that is >4 μm and can be in a range of 4 μm to 12 μm. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 2 is suitable for all or a portion of the waveguides selected from the group consisting of the cavity waveguide 12, utility waveguide 16, reference waveguide 27, comparative waveguide 30, first detector waveguide 36, second detector waveguide 38, sampling waveguide 52, control waveguide 57, and interferometer waveguide 60.

The light source 10 that is interfaced with the utility waveguide 16 can be a gain element that is a component separate from the chip and then attached to the chip. For instance, the light source 10 can be a gain element that is attached to the chip using a flip-chip arrangement.

Use of flip-chip arrangements is suitable when the light source 10 is to be interfaced with a ridge waveguide on a chip constructed from silicon-on-insulator wafer. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23 1999; each of which is incorporated herein in its entirety. The constructions are suitable for use as the light source 10. When the light source 10 is a gain element, the electronics 62 can change the frequency of the outgoing LIDAR signal by changing the level of electrical current applied to through the gain element.

The attenuators can be a component that is separate from the chip and then attached to the chip. For instance, the attenuator can be included on an attenuator chip that is attached to the chip in a flip-chip arrangement. The use of attenuator chips is suitable for all or a portion of the attenuators selected from the group consisting of the data attenuator and the control attenuator.

As an alternative to including an attenuator on a separate component, all or a portion of the attenuators can be integrated with the chip. For instance, examples of attenuators that are interfaced with ridge waveguides on a chip constructed from a silicon-on-insulator wafer can be found in U.S. Pat. No. 5,908,305, issued on Jun. 1 1999; each of which is incorporated herein in its entirety. The use of attenuators that are integrated with the chip are suitable for all or a portion of the light sensors selected from the group consisting of the data attenuator and the control attenuator.

Light sensors that are interfaced with waveguides on a chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the chip as illustrated in FIG. 1. Alternately, all or a portion the waveguides that terminate at a light sensor can terminate at a facet 18 located at an edge of the chip and the light sensor can be attached to the edge of the chip over the facet 18 such that the light sensor receives light that passes through the facet 18. The use of light sensors that are a separate component from the chip is suitable for all or a portion of the light sensors selected from the group consisting of the first light sensor 40, the second light sensor 42, the sampling light sensor 54, and the control light sensor 61.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10 2012; U.S. Pat. No. 8,242,432, issued Aug. 14 2012; and U.S. Pat. No. 6,108, 872, issued on Aug. 22, 2000 each of which is incorporated herein in its entirety. The use of light sensors that are integrated with the chip are suitable for all or a portion of the light sensors selected from the group consisting of the first light sensor 40, the second light sensor 42, the sampling light sensor 54, and the control light sensor 61.

Construction of optical gratings that are integrated with a variety of optical device platforms are available. For instance, a Bragg grating can be formed in a ridge waveguides by forming grooves in the top of the ridge and/or in the later sides of the ridge.

In some instances, it is desirable to scan the LIDAR output signal. The above chip construction is suitable for use with various scanning mechanisms used in LIDAR applications. For instance, the output LIDAR signal can be received by one or more reflecting devices and/or one more collimating devices. The one or more reflecting devices can be configured to re-direct and/or steer the LIDAR output signal so as to provide scanning of the LIDAR output signal. Suitable reflecting devices include, but are not limited to, mirrors such mechanically driven mirrors and Micro Electro Mechanical System (MEMS) mirrors. The one or more collimating devices provide collimation of the LIDAR output signal and can accordingly increase the portion of the LIDAR input signal that is received in the utility waveguide 16. Suitable collimating devices include, but are not limited to, individual lenses and compound lenses.

Figure 3:
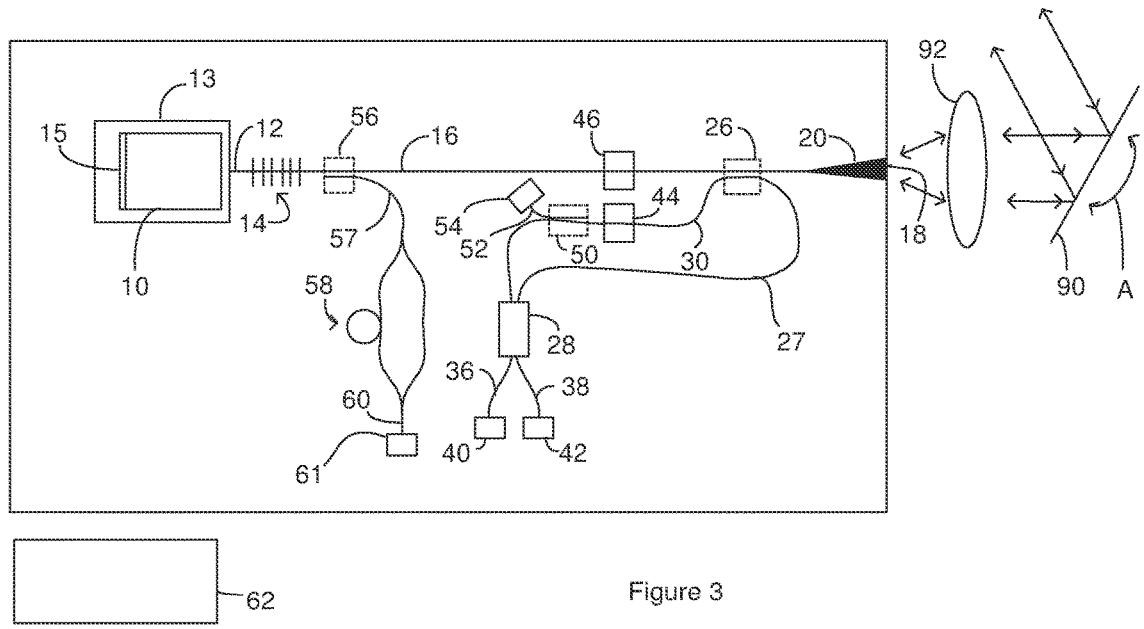
FIG. 3 illustrates the LIDAR chip of FIG. 1 used with an off-chip scanning mechanism.

FIG. 3 illustrates the above chip used with a reflecting device 90 and a collimating device 92. For instance, a lens serves as a collimating or focusing device that receives the LIDAR output signal and provides collimation or focusing of the LIDAR output signal. A mirror serves as a reflecting device 90 that receives the LIDAR output signal and reflects the LIDAR output signal in the desired direction. As is illustrated by the arrow labeled A, the electronics can move the mirror so as to steer the collimated or focused LIDAR output signal and/or scan the collimated or focused LIDAR output signal. The movement of the mirror can be in two dimensions or three dimensions. Suitable mirrors include, but are not limited to, mechanically driven mirrors and Micro Electro Mechanical System (MEMS) mirrors.

Figure 4:
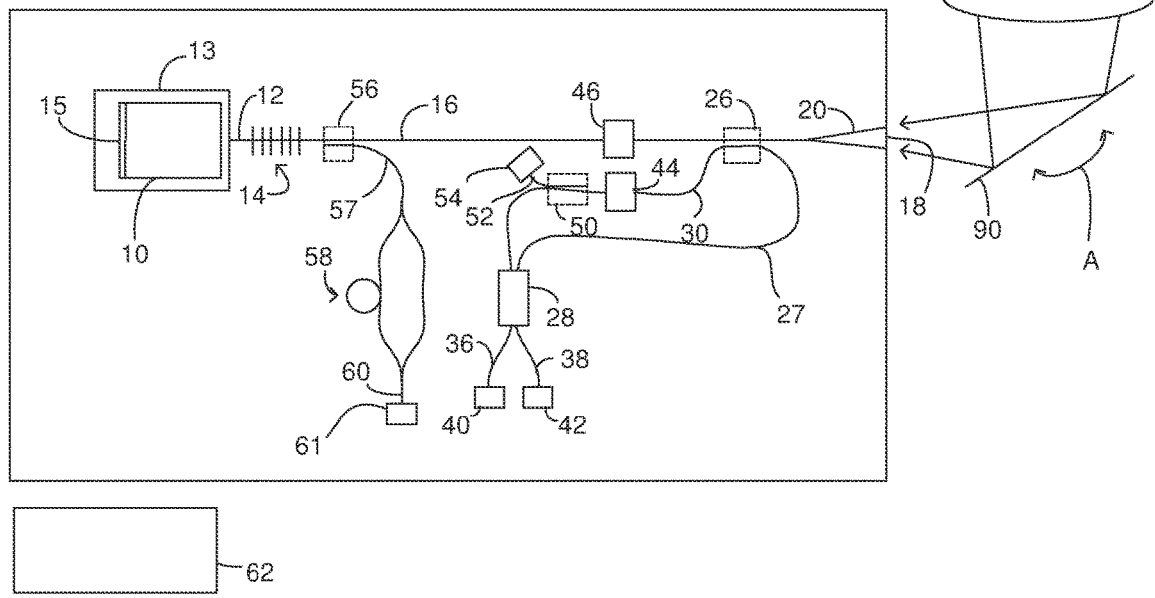
FIG. 4 illustrates the LIDAR chip of FIG. 1 used with another embodiment of an off-chip scanning mechanism.

FIG. 4 illustrates the above chip used with a reflecting device 90 and a collimating or focusing device 92. For instance, a mirror serves as a reflecting device 90 that receives the LIDAR output signal and reflects the LIDAR output signal in the desired direction. As is illustrated by the arrow labeled A, the electronics can move the mirror so as to steer the LIDAR output signal and/or scan the LIDAR output signal. A lens serves as a collimating or focusing device 92 that receives the LIDAR output signal from the mirror and provides collimation or focusing of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The movement of the mirror can be in two dimensions or three dimensions. Suitable mirrors include, but are not limited to, mechanically driven mirrors and Micro Electro Mechanical System (MEMS) mirrors.

Figure 5:
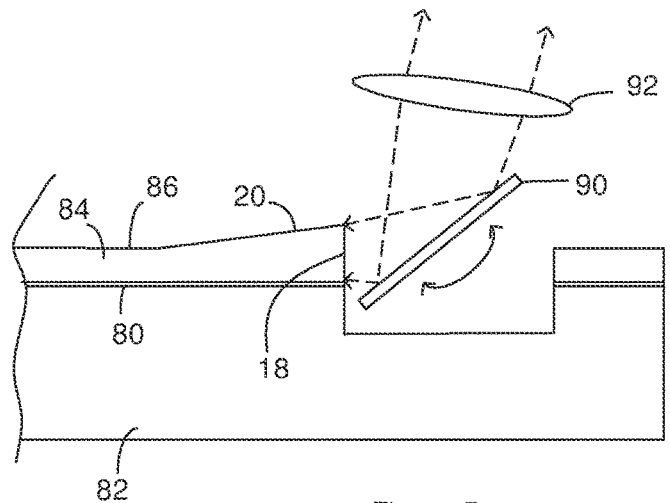
FIG. 5 is a cross section of the LIDAR chip of FIG. 1 having an integrated scanning mechanism.

Technologies such as SOI MEMS (Silicon-On-Insulator Micro Electro Mechanical System) technology can be used to incorporate a reflecting device such as a MEMS mirror into the chip. For instance, FIG. 5 is a cross section of a portion of the chip taken through the longitudinal axis of the utility waveguide 16. The illustrated chip was constructed on silicon-on-insulator waveguide. A mirror recess extends through the light-transmitting medium to the base. The mirror is positioned in the mirror recess such that the mirror receives the LIDAR output signal from the utility waveguide. A lens serves as a collimating or focusing device 92 that receives the LIDAR output signal from the mirror and provides collimation or focusing of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The electronics can control movement of the mirror in two or three dimensions.

The above chips can include alternative methods of scanning and/or steering the LIDAR output signal in addition to a reflecting device or as an alternative device. For instance, the chip can include a component for splitting the outgoing LIDAR signal into multiple output signals. The chip can then tune the phase difference between different output signals so as to control the direction that the LIDAR output signal travels away from the chip. The LIDAR output signal can be steered or scanned by changing the level of the phase difference between the output signals. Suitable systems that employ phase differential between output signals to steer a LIDAR output signal are described in U.S. Patent Application Ser. No. 62/683,958, filed on Jun. 12, 2018, and incorporated herein in its entirety and in U.S. Patent Application Ser. No. 62/680,787, filed on Jun. 5, 2018, and incorporated herein in its entirety.

Figure 6:
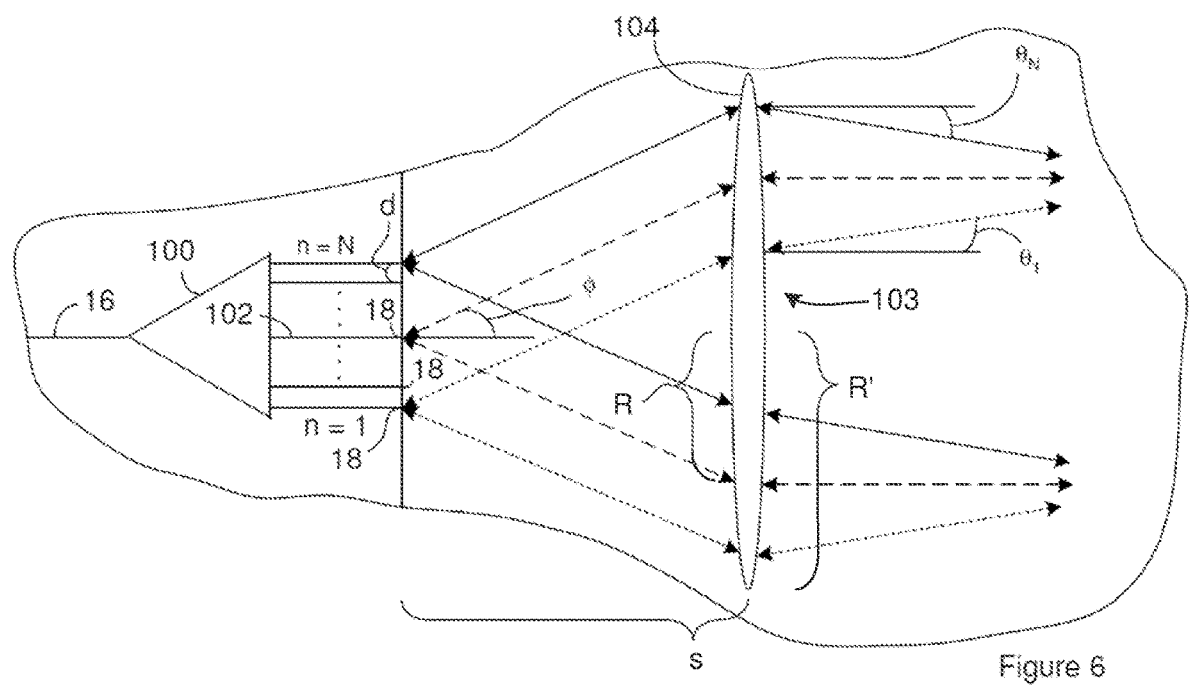
FIG. 6 is a schematic of a LIDAR system that includes a LIDAR chip and a redirection component.

Another alternative for scanning and/or steering the LIDAR output signal can include optical switching. FIG. 6 illustrates a LIDAR system that includes a LIDAR chip and a redirection component. In FIG. 6, a portion of the LIDAR chip is illustrated. The illustrated portion of the LIDAR chip is configured to use optical switching to steer a LIDAR output signal. The portion(s) of the chip that are not illustrated in FIG. 6 can be constructed as described elsewhere in this Patent Application. For instance, the utility waveguide 16 shown in FIG. 6 can be the utility waveguide 16 of a LIDAR chip such as the LIDAR chip disclosed in the context of FIG. 1.

The utility waveguide 16 carries the outgoing LIDAR signal to an optical switch 100 that directs the outgoing LIDAR signal to one of multiple alternate waveguide 102 that are each associated with a waveguide index n=1 through N. Each of the alternate waveguides 102 terminates at a facet 18. The alternate waveguide 102 that receives the outgoing LIDAR signal guides the outgoing LIDAR signal to a facet 18 through which the outgoing LIDAR signal exits from the alternate waveguide 102 and serves as the LIDAR output signal. Accordingly, the optical switch 100 can direct the outgoing LIDAR signal to any one of the facets 18 through which the outgoing LIDAR signal passes and serves as a LIDAR output signal.

The LIDAR output signal can be reflected off an object located off of the chip. At least a portion of the reflected signal travels back to the facet 18 through which it exited the alternate waveguide and enters the associated alternate waveguide 102 as a LIDAR input signal. The alternate waveguide 102 guides the LIDAR input signal to the optical switch 100 which directs the LIDAR input signal back to the utility waveguide 16. The chip and electronics can then process the LIDAR input signal.

The electronics can operate the optical switch 100 so as to change the alternate waveguide 102 that receives the outgoing LIDAR signal. Accordingly, the electronics can cause the outgoing LIDAR signal to be directed to a particular one of the alternate waveguides 102 and accordingly to a particular one of the facets 18.

The LIDAR system also includes a redirection component configured to receive the outgoing LIDAR signal from any one of the alternate waveguides and to redirect the received outgoing LIDAR signal such that a direction that the outgoing LIDAR signal travels away from the redirection component is a function of the alternate waveguide from which the redirection component receives the outgoing LIDAR signal. The direction of the outgoing LIDAR signal can be a function of the alternate waveguide in that the direction that the outgoing LIDAR signal travels away from the redirection component changes in responses to changes in the alternate waveguide from which the redirection component receives the outgoing LIDAR signal. In some instances, the redirection component is configured such that none of the different directions is parallel to one another. For instance, the redirection component can be configured such that the outgoing LIDAR signal travels away from the redirection component at a different transmission angle when the redirection component receives the outgoing LIDAR signal from different alternate waveguides where the transmission angle being measured relative to the redirection component.

In FIG. 6, a lens 104 serves as the redirection component 103. The lens 104 that is positioned to receive the outgoing LIDAR signals that serves as the LIDAR output signal. The lens 104 and alternate waveguides 102 are arranged such that LIDAR output signals from different alternate waveguides 102 are incident on different regions of an input side of the lens 104 and/or have a different incident angle on the input side of the lens 104. As a result, LIDAR output signals from different alternate waveguides 102 travel away from the lens 104 in different directions. For instance, the alternate waveguides 102 are labeled n=1 through n=N in FIG. 6. The transmission angle of the LIDAR output signals (outgoing LIDAR signal) when the redirection component 103 receives the LIDAR output signal from the alternate waveguide labeled n=1 through N is labeled $\theta_n$ in FIG. 6. Accordingly, when the LIDAR output signal is directed to the alternate waveguide labeled n=1, the LIDAR output signal has transmission angle $\theta_n$. The transmission angle is measured relative to the redirection component 103. For instance, the transmission angle can be measured between the optical axis of the lens and the LIDAR output signal. As is evident from FIG. 6, the angle $\theta_n$ is different for different alternate waveguides 102. Since the LIDAR output signals from different alternate waveguides 102 travel away from the lens 104 in different directions, the electronics can control the direction of the LIDAR output signal by operating the switch so as to direct the outgoing LIDAR signal to the alternate waveguide 102 that provides the LIDAR output signal with the desired direction. The degree of change in direction from one alternate waveguide 102 to another alternate waveguide 102 can be a function of the lens construction. Accordingly, the lens construction can be altered to increase or decrease the degree of change in direction between alternate waveguides.

During operation of the system, the electronics can delay switching the alternate waveguide 102 that receives the outgoing LIDAR signal until the chip has received the LIDAR input signal that is needed for the desired processing. As a result, the LIDAR output signal and the associated LIDAR input signal are guided by the same alternate waveguide 102.

In FIG. 6, R represents the radius of the LIDAR output signal at the input side of the lens, R' represents the lens radius, and s represents the object distance from the lens. The value of R' can be selected to increase the amount of diverging light that is captured by the lens. The ratio of R/s can be used to approximate the value needed for R' and can be a function of the divergence angle of the light from the waveguide facet. To increase capture of the diverging light, twice the divergence half angle $\phi$, can be used. In that case, R/s can be at least equal to tan(2$\phi$). For example, for an alternative waveguide facet dimension of 10 μm in the lateral direction, the lateral divergence half angle $\phi$, is approximately 6°. In that case R/s can be at least equal to)tan(12°=1/5. R' represents the lens radius which can be larger than the half-width of the LIDAR output signal (R) to accommodate the change in position of the LIDAR output signal on the lens due to switching between the alternate waveguides. In some instances, the R' is greater than or equal to R, 1.3R, or 1.6R and/or less than or equal to 4R, or 6R where R is greater than or equal to s*tan(2$\phi$).

The center-to-center distance of the facets 18 is labeled d in FIG. 6. The angular resolution can be improved by decreasing d. In some instances, the center-to-center distance is constant for each adjacent pair of facets. However, the center-to-center distance can be different for different pairs of facets. A suitable center-to-center distance between facets 18 includes, but is not limited to, distances greater than 5, 10, or 50 μm and/or less than 100, 1,000, or 10,000 μm.

The maximum value for N can be the nearest integer value to (1+2(R'-R)/d) where R is the diameter of the LIDAR output signals at the input side of the lens 104 and R' is the lens radius. Accordingly, the chip can include a number of alternate waveguides 102 less than or equal to the nearest integer value of (1+2(R'-R)/d). In some instances, N is greater than or equal to 5, 10, or 50 and/or less than 100, 500, or 1000. The angular range that can be scanned (2$\theta_N$) by sequentially directing the LIDAR output signal to each of the alternate waveguides 102 can be increased by increasing N. Accordingly, an improved resolution can be obtained by decreasing d and an improved scan range obtained by increasing N within the limits of the optical system.

Figure 7:
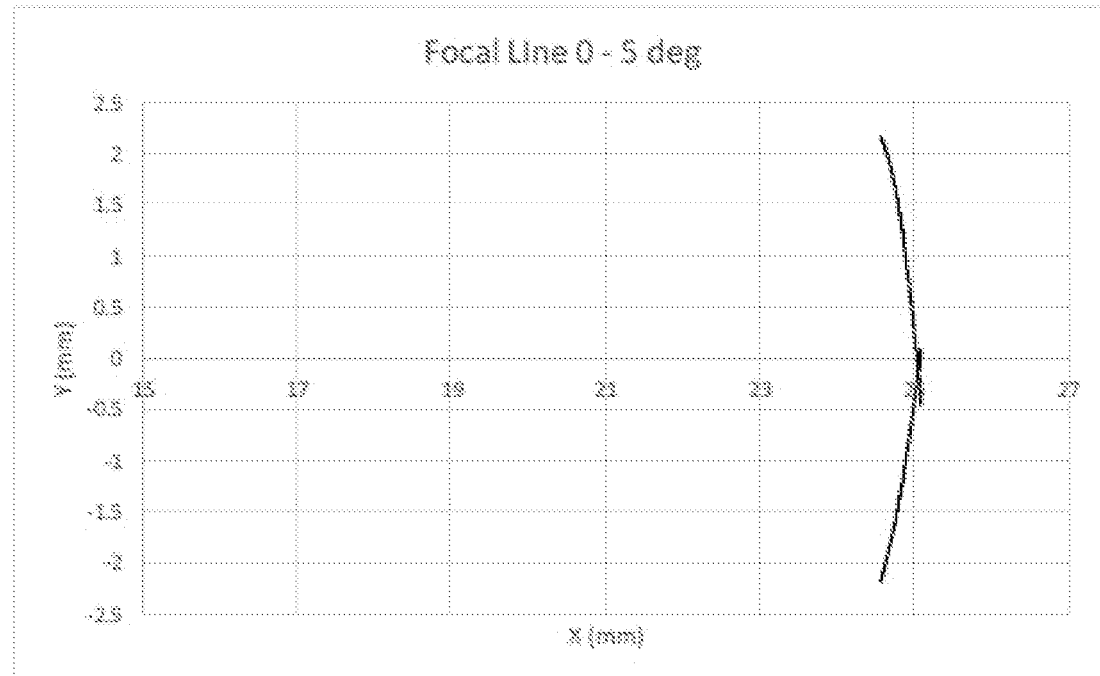
FIG. 7 illustrates the focal points for a lens located along an arced line.
Figure 8A:
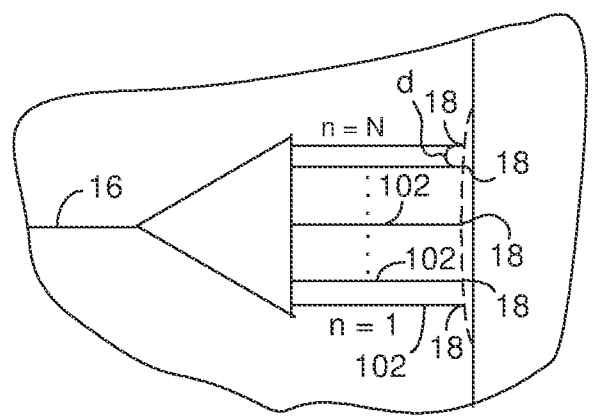
FIG. 8A illustrates a LIDAR the chip having alternate waveguides that terminate at facets positioned along an arced line.

The lens 104 can be configured such that the lens 104 collimates the LIDAR output signals from different facets. Additionally or alternatively, the lens 104 can be positioned such that one or more of the facets is located at a focal point of the lens 104. However, the focal points are typically positioned along an arced line. For instance, FIG. 7 illustrates the focal points for a lens having a focal length of 25 mm. The y-axis represents the distance of the center of a facet 18 from the optical axis of the lens. The lens is positioned at x=0 mm. In order for the facets to be positioned at the focal points of the lens, the facets would be positioned along the arced line in FIG. 7. As illustrated in FIG. 8A, the chip can be constructed such that the facets 18 are positioned along an arced line (the dashed line). A chip constructed on a silicon-on-insulator wafer can be provided with facets 18 positioned along an arced line by etching the facets 18 in the silicon light-transmitting medium. As is evident from FIG. 8A, this arrangement can result in all or a portion of the facets 18 being positioned back from an edge of the chip or from an edge of the substrate. Alternately, the edge of the chip can be arced and the facets 18 can be positioned at an edge of the chip.

Figure 8B:
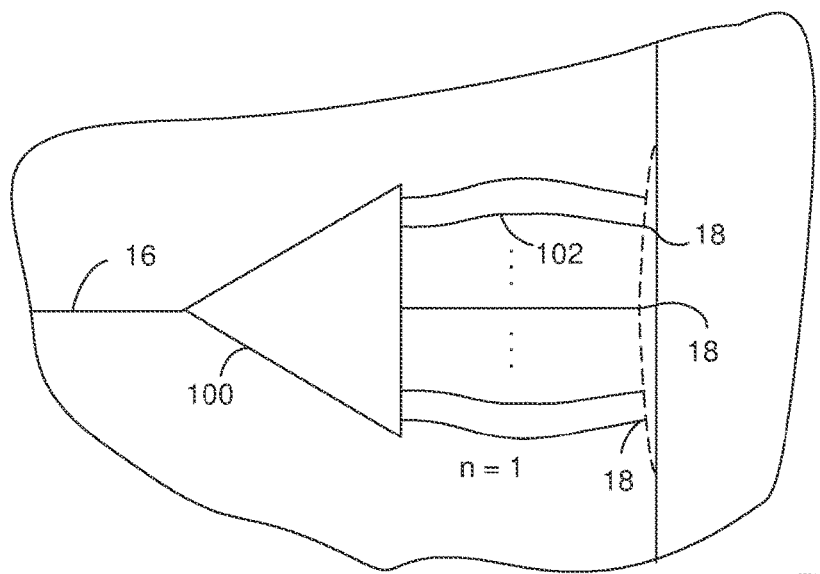
FIG. 8B illustrates a LIDAR the chip having alternate waveguides that terminate at facets. At least a portion of the alternate waveguides are curved so that outgoing LIDAR signals approach the facets from different directions.

As an alternative to the positioning the facets 18 along an arced focal point line or in addition to positioning the facets along an arced focal point line, the alternate waveguides 102 can be curved such that direction of propagation of the outgoing LIDAR signals at the facets of different alternate waveguides 102 is different for different alternate waveguides 102. For instance, FIG. 8B illustrates a portion of the alternate waveguides 102 curved so that the outgoing LIDAR signals approach the facets 18 from different directions. The curving of the alternate waveguides 102 can couple additional light into the lens. Although FIG. 8B illustrates the facets positioned along the arced focal point line, the facets need not be positioned along the arced focal point line.

Figure 9:
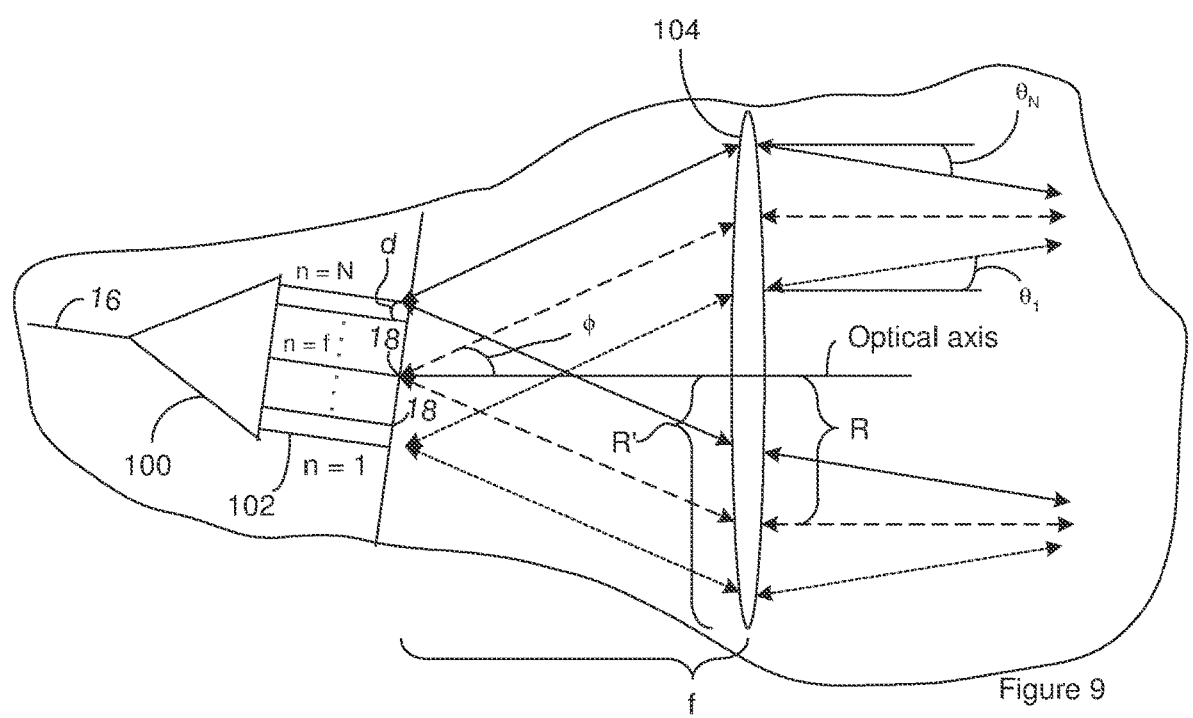
FIG. 9 illustrates a LIDAR chip having alternate waveguides that terminate at facets positioned along a line angled such that the facets for alternate waveguides n=f through n=N are positioned along an approximation of an arced focal point line.

Another alternative is to angle the chip and/or the facets such that the positions of at least a portion of the facets 18 are positioned along a line that approximates the arced focal point line. In particular, the facets 18 on one side of the optical axis of the lens can be positioned along a line that approximates the arced focal point line. For instance, FIG. 9 illustrates a LIDAR chip having facets 18 positioned along a line angled such that the facets for alternate waveguides n=f through n=N are positioned along an approximation of the arced focal point line. However, the facets for alternate waveguides n=(f−1) through n=1 become further away from the arced focal point line as they approach alternate waveguides n=1. As a result, the electronics may not operate all or a portion of alternate waveguides n=(f−1) through n=1. Alternately, the chip can be constructed without all or a portion of alternate waveguides n=1 through n=(f−1). Alternately, the chip can positioned such that all, more than 50%, or more than 75% of the facets are on the same side of the optical axis.

Figure 10:
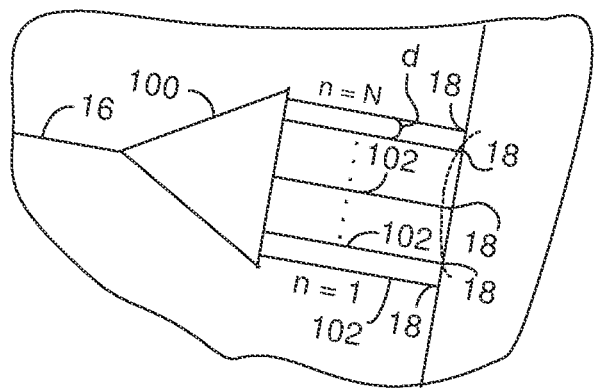
FIG. 10 illustrates a LIDAR chip having alternate waveguides that terminate at facets positioned such that a straight line can pass through each of the facets. The LIDAR chip is positioned such that a portion of the facets are positioned on one side of an arced focal point line and another portion of the facets are positioned on another side of the arced focal point line and the arced focal point line passes through the straight line through the facets at least twice.

Positioning the chip such that the facets 18 are positioned along a line that approximates the arced focal point line can include positioning the chip such that a portion of the facets 18 are positioned on one side of the arced focal point line and another portion of the facets are positioned on another side of the arced focal point line. In some instances, the chip includes the facets arranged such that a line can pass through each of the facets and the chip is positioned such that a portion of the facets 18 are positioned on one side of the arced focal point line and another portion of the facets 18 are positioned on another side of the arced focal point line and the arced focal point line passes through the line through the facets 18 at least two times. FIG. 10 provides an illustration of this arrangement where the dashed line represents the focal point line and a portion of the edge of the chip represents a line segment through the facets 18. Since the facets are often non-perpendicular to the direction of propagation in the associated alternate waveguide, the line through the facets is often not parallel to the plane of each of the facets.

Figure 11:
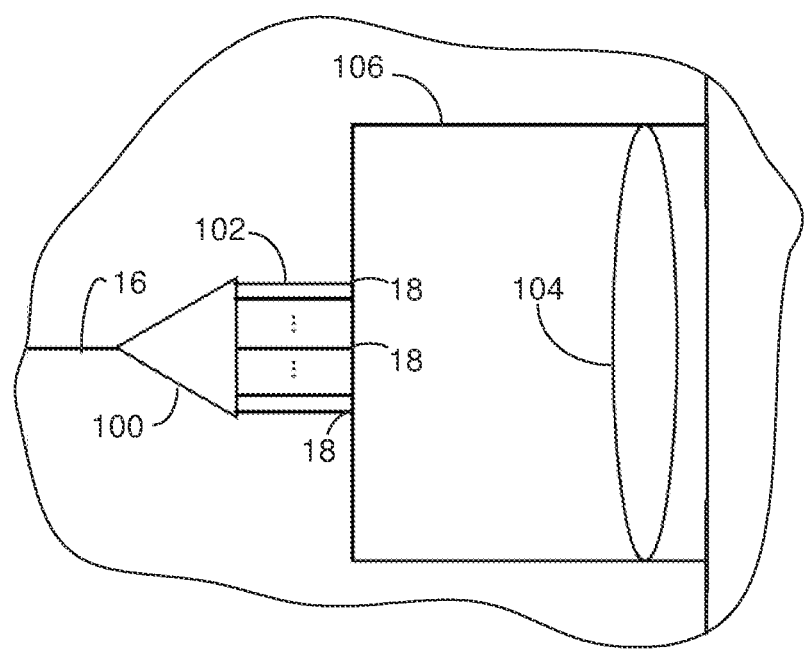
FIG. 11 is a topview of a LIDAR chip having a lens integrated into the LIDAR chip.

Although the lens is illustrated as being spaced apart from the chip, the lens can be integrated with the chip. For instance, FIG. 11 illustrates a portion of the above chip(s) modified to include a lens 104. The lens is optically aligned with the facets 18 of the alternate waveguides such that the lens 104 receives the LIDAR output signals. The lens can be positioned in a recess 106. When the chip is constructed on a silicon-on-insulator the recess can extend into or through the light-transmitting medium. In some instances, the recess extends through the light-transmitting medium and into the base. For instance, the recess can extend through the light-transmitting medium and into or through the buried layer. In some instances, the recess extends through the buried layer and into the substrate. In some instances, the lens is a separate component that is attached to the chip using technologies such as micro-optical assembly, and pick-and-place technology. In some instances, the lens is an integral chip component formed using technologies such as etching. For instance, when the chip is constructed on a silicon-on-insulator the lens can be formed by etching the light-transmitting medium.

Suitable optical switches for use with the chip include, but are not limited to, cascaded 2×2 Mach-Zehnder (MZ) modulators interferometers using thermal or free-carrier injection phase shifters, and micro-ring resonator switches.

Figure 12A:
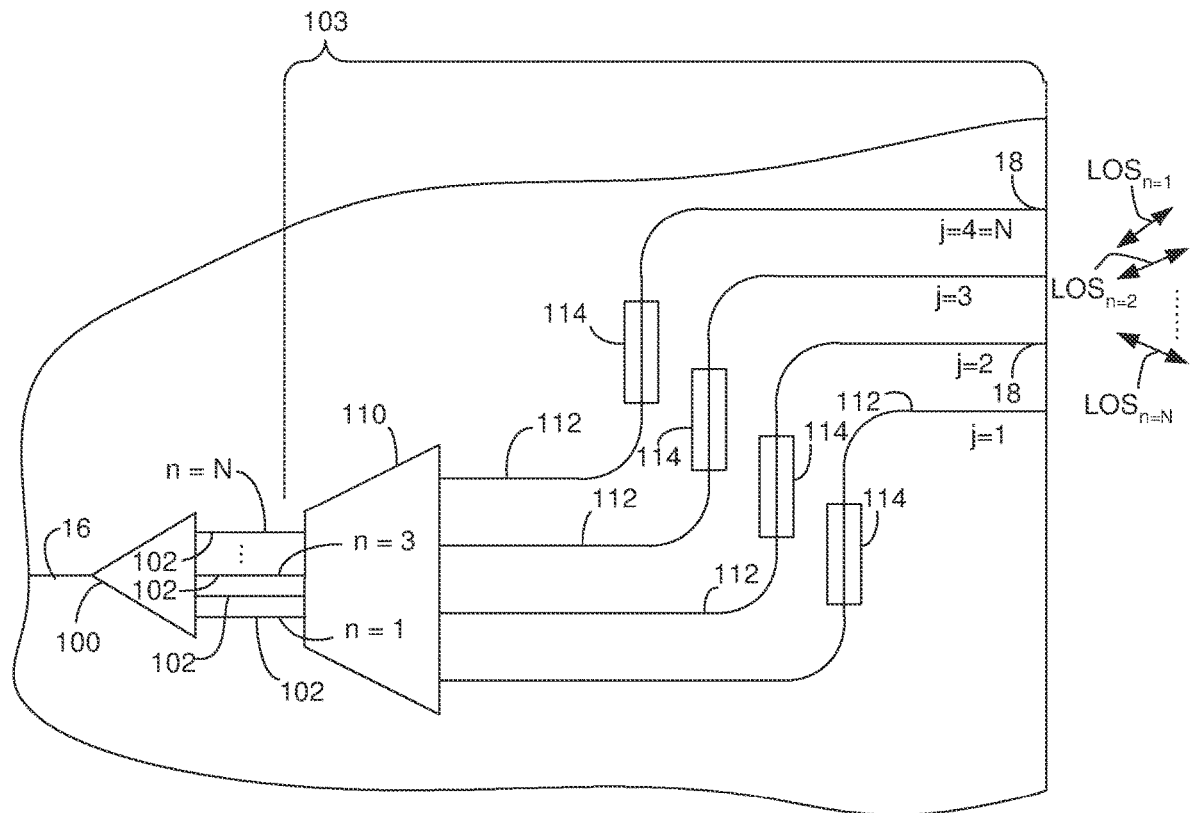
FIG. 12A is a topview of a schematic of a LIDAR system that includes a LIDAR chip and another embodiment of a redirection component. The redirection component outputs multiple different modes of a LIDAR output signal.

Although the above discussion uses a lens as a redirection component, other redirection components can be employed. For instance, a mirror can be used in place of the lens. Suitable mirrors include, but are not limited to curved mirrors such as parabolic curved mirrors. In some instances, the mirror is angled to reflect the LIDAR output beams above or below the surface of the LIDAR chip and or facets polished at an angle may be used to direct the LIDAR output signals initially above the plane of the chip. FIG. 12A illustrates a LIDAR system that includes another embodiment of a redirection component 103. In FIG. 12A, a portion of the LIDAR chip is illustrated. The illustrated portion of the LIDAR chip is configured to use optical switching to steer a LIDAR output signal. The portion(s) of the chip that are not illustrated in FIG. 12A can be constructed as described elsewhere in this Patent Application. For instance, the utility waveguide 16 shown in FIG. 12A can be the utility waveguide 16 of a LIDAR chip such as the LIDAR chip disclosed in the context of FIG. 1.

The utility waveguide 16 carries the outgoing LIDAR signal to an optical switch 100 that directs the outgoing LIDAR signal to one of multiple alternate waveguide 102. The alternate waveguide 102 that receives the outgoing LIDAR signal guides the outgoing LIDAR signal to the redirection component 103. Although the redirection component of FIG. 6 is located off the LIDAR chip, the redirection component of FIG. 12A can be integrated into the LIDAR chip.

The electronics can operate the optical switch 100 so as to change the alternate waveguide 102 that receives the outgoing LIDAR signal. Accordingly, the electronics can cause the outgoing LIDAR signal to be directed to a particular one of the alternate waveguides 102.

The redirection component is configured to receive the outgoing LIDAR signal from any one of the alternate waveguides and then direct the received outgoing LIDAR signal such that outgoing LIDAR signals received from different alternate waveguides travel away from the redirection component 103 in different directions. In some instances, the redirection component is configured such that none of the different directions is parallel to one another.

The redirection component 103 includes a splitter 110 that divides the outgoing LIDAR signal into multiple output signals that are each carried on a steering waveguide 112. Each of the steering waveguides 112 ends at a facet 18. The facets 18 are arranged such that the output signals exiting the chip through the facets 18 combine to form the LIDAR output signal and/or to effectively re-form the outgoing LIDAR signal.

The splitter 110 and steering waveguides 112 can be constructed such that there is not a phase differential between output signals at the facet 18 of adjacent steering waveguides 112. For instance, the splitter 110 can be constructed such that each of the output signals is in-phase upon exiting from the splitter 110 and the steering waveguides 112 can each have the same length. Alternately, the splitter 110 and steering waveguides 112 can be constructed such that there is a linearly increasing phase differential between output signals at the facet 18 of adjacent steering waveguides 112. For instance, the steering waveguides 112 can be constructed such that the phase of steering waveguide number j is $f_o+(j-1)f$ where j is an integer from 1 to M and represents the number associated with a steering waveguide when the steering waveguides are sequentially numbered as shown in FIG. 12A, f is the phase differential between neighboring steering waveguides when the phase tuners (discussed below) do not affect the phase differential, and $f_o$ is the phase of the output signal at the facet 18 of steering waveguide j=1. In some instances, this phase differential is achieved by constructing the steering waveguides such that the steering waveguides have a linearly increasing length differential. For instance, the length of steering waveguide j can be represented by $l_o+(j-1)\Delta l$ where j is an integer from 1 to M and represents the number associated with a steering waveguide when the steering waveguides are sequentially numbered as shown in FIG. 12A, $\Delta l$ is the length differential between neighboring steering waveguide, and $L_o$ is the length of steering waveguide j=1. When the steering waveguides are the same length, the value of $\Delta l$ is zero and the value of f is zero. Suitable $\Delta l$ include, but are not limited to, $\Delta l$ greater than 0, or 5 and/or less than 10, or 15 µm. Suitable f include, but are not limited to, f greater than $0\pi$, or $7\pi$ and/or less than $15\pi$, or $20\pi$. Suitable M include, but are not limited to, M greater than 10, 100, or 1000 and/or less than 10000, or 50000.

A phase tuner 104 can be positioned along at least a portion of the steering waveguides 102. Although a phase tuner 104 is shown positioned along the first and last steering waveguide, these phase tuners are optional. For instance, the chip need not include a phase tuner on steering waveguide j=1.

The electronics can be configured to operate the phase tuners so as to create a phase differential between the output signals at the facet 18 of adjacent steering waveguides 102. The electronics can operate the phase tuners such that the phase differential is constant in that it increases linearly across the steering waveguides. For instance, electronics can operate the phase tuners such that the tuner-induced phase of steering waveguide number j is $(j-1)\alpha$ where j is an integer from 1 to M and represents the number associated with a steering waveguide 112 when the steering waveguides 112 are sequentially numbered as shown in FIG. 12, $\alpha$ is the tuner-induced phase differential between neighboring steering waveguides. Accordingly, the phase of steering waveguide number j is $f_o+(j-1)f+(j-1)\alpha$. FIG. 12 illustrates the chip having only 4 steering waveguides in order to simplify the illustration, however, the chip can include more steering waveguides. For instance, the chip can include more than 4 steering waveguides, more than 100 steering waveguides, or more than 1000 steering waveguides and/or less than 5000 steering waveguides.

The electronics can be configured to operate the phase tuners so as to tune the value of the phase differential $\alpha$. Tuning the value of the phase differential $\alpha$ changes the direction that the LIDAR output signal travels away from the chip ($\theta$). Accordingly, the electronics can scan the LIDAR output signal by changing the phase differential $\alpha$. The range of angles over which the LIDAR output signal can be scanned is $\phi_R$ and, in some instances, extends from $\phi_v$ to $-\phi_v$ with $\phi=0°$ being measured in the direction of the LIDAR output signal when $\alpha=0$. When the value of $\Delta l$ is not zero, the length differential causes diffraction such that light of different wavelengths travels away from chip in different directions ($\theta$). Accordingly, there may be some spreading of the outgoing LIDAR signal as it travels away from the chip. Further, changing the level of diffraction changes the angle at which the outgoing LIDAR signal travels away from the chip when $\alpha=0°$. However, providing the steering waveguides with a length differential ($\Delta l \neq 0$) can simplify the layout of the steering waveguides on the chip.

The alternate waveguides 102 are constructed such that different alternate waveguides 102 guide the outgoing LIDAR signal to different locations on an input side of the splitter 110. The splitter is constructed such that the output signals enter the steering waveguides 112 with a phase differential that changes in response to the location where the outgoing LIDAR signal enters the splitter 110. As a result, the phase differential between the output signals changes based on which alternate waveguide the outgoing LIDAR signal uses to enter the splitter 110. The splitter 100 can be wavelength independent in contrast to a demultiplexer. Examples of wavelength independent splitters where the phase differential between the output signals changes in response to the location where the outgoing LIDAR signal enters the splitter 110 include, but are not limited to, star couplers.

Since the phase differential between the output signals changes based on the alternate waveguide the outgoing LIDAR signal uses to enter the splitter 110, the direction that resulting LIDAR output signal travels away from the redirection component is a function of the alternate waveguide 102 that the outgoing LIDAR signal uses to enter the splitter 110. As a result, the LIDAR output signal can be associated with different alternate waveguides 102. For instance, FIG. 12A illustrates a LIDAR output signals that includes several different modes labeled $LOS_E$ where the n corresponds to the alternate waveguide 102 indices n=1 through N. As a result, the light for $LOS_2$ (LIDAR output signal mode 2) enters the splitter 110 on the alternate waveguide 102 with index n=2 and the light for $LOS_N$ enters the splitter 110 on the alternate waveguide 102 with index n=N. Since each of the $LOS_1$ through $LOS_N$ travels away from the redirection component 103 in different directions, the direction that the LIDAR output signal (the outgoing LIDAR signal) travels away from the redirection component 103 changes in response to changes in the alternate waveguide 102 on which the outgoing LIDAR signal entered the splitter 110. Because this change in direction occurs due to a phase shift induced by the splitter 110, the phase shifters 114 need not be operated or changed to cause the change in direction shown in FIG. 12A. As a result, the electronics can change the direction of the LIDAR output signal (the outgoing LIDAR signal) by changing the alternate waveguide 102 to which the optical switch 100 directs the outgoing LIDAR signal.

Because the optical switch 100 can also be used to affect the phase differential between adjacent output signals at the facet 18 of adjacent steering waveguides, the phase differential between adjacent output signals at the facet 18 of adjacent steering waveguides can be a function of one or more factors selected from the group consisting of construction of the splitter 110, construction of the steering waveguides 112, the operation of any phase tuners 104, and the alternate waveguide 102 to which the outgoing LIDAR signals is directed. As a result, the direction that the LIDAR output signal travels away from the redirection component 103 is a function of one or more factors selected from the group consisting of construction of the splitter 110, construction of the steering waveguides 112, the operation of any phase tuners 104, and the alternate waveguide 102 to which the outgoing LIDAR signals is directed.

Figure 12B:
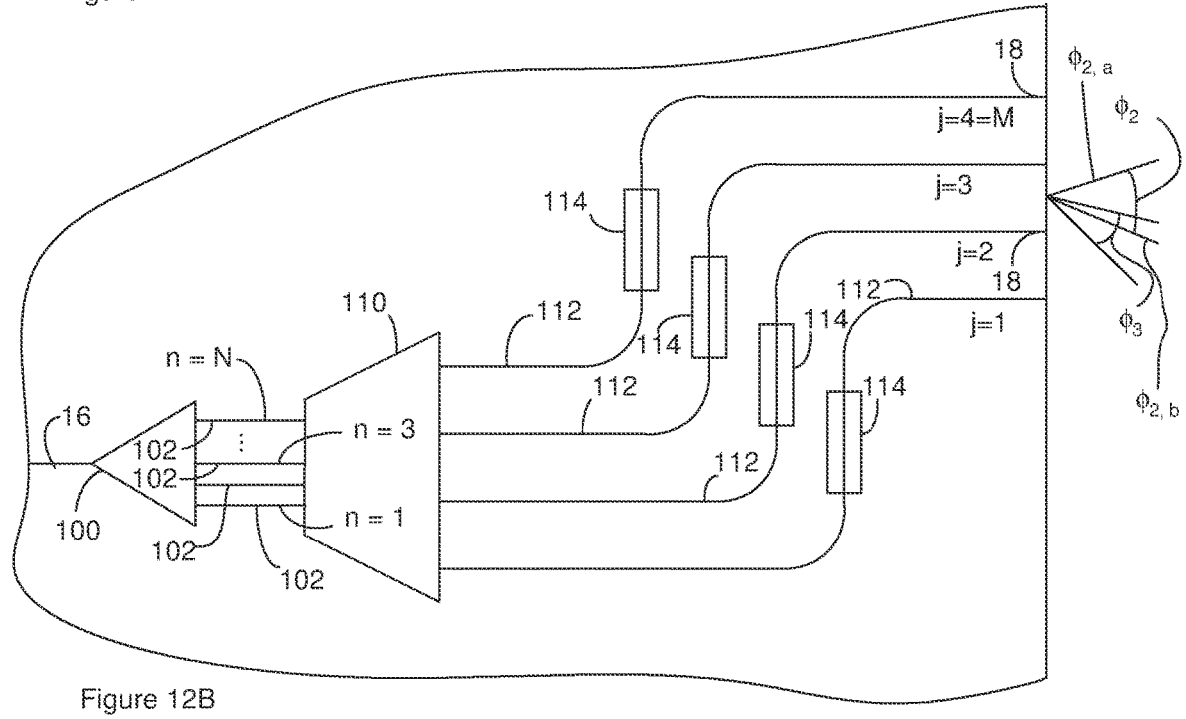
FIG. 12B is the schematic of FIG. 12A modified to show overlapping angular ranges for a portion of the LIDAR output signal modes shown in FIG. 12A.

More than one of these factors can be used to tune the direction of the outgoing LIDAR signal. For instance, the optical switch 100 and the phase tuners 104 can be used together to tune the direction of the LIDAR output signal. Each of the LIDAR output signals labeled $LOS_n$ in FIG. 12A can be tuned over an angular range $\phi_n$ using the phase tuners 104. The angular range over which the LIDAR output signal labeled $LOS_2$ in FIG. 12A can be tuned using the phase tuners 104 is labeled $\phi_2$ in FIG. 12B and the angular range over which the LIDAR output signal labeled LOSS in FIG. 12A can be tuned using the phase tuners 104 is labeled $\phi_3$ in FIG. 12B. Each of the angular ranges covers angles from $\phi_{n,a}$ to $\phi_{n,b}$ where the angles covered by each of the different angular ranges can be different such that no two angular ranges have the same to values for $\phi_{n,a}$ and $\phi_{n,b}$. As is shown in FIG. 12B, in some instances, the redirection component is configured such that the angular ranges for different LIDAR output signal modes ($LOS_n$) overlap one another. As a result, by combining the steering provided by the phase tuners ($\phi_n$) with the steering provided by the optical switch, the LIDAR output signal can be steered within a continuous range of directions over the full field of view.

A variety of approaches can be used to increase the angular ranges for the LIDAR output signal modes ($LOS_n$). For instance, increasing the separation between the waveguides 102 can increase the angular ranges for the LIDAR output signal modes ($LOS_n$).

When the selection of the alternate waveguide 102, the construction of the splitter 110 and steering waveguides 112 and the operation of any phase tuners 104 is such that the phase differential between adjacent output signals at the facet 18 of adjacent steering waveguides 112 changes linearly, the resulting LIDAR output signals are collimated. When the selection of the alternate waveguide 102, the construction of the splitter 110 and steering waveguides 112 and the operation of any phase tuners 104 is such that the phase differential between adjacent output signals at the facet 18 of adjacent steering waveguides 112 changes non-linearly, the resulting LIDAR output signals can be focused. Accordingly, the level of divergence, collimation, or focus can be selected by construction of one or more factors selected from the group consisting of the selection of the alternate waveguide 102, the construction of the splitter 110, construction of the steering waveguides 112 and the operation of any phase tuners 104.

The LIDAR output signal can be reflected off an object located off of the chip. At least a portion of the reflected signal travels from the back into the steering waveguides 112 and enters the alternate waveguide 102 from which the outgoing LIDAR signal originated as a LIDAR input signal or incoming LIDAR signal. The alternate waveguide 102 guides the LIDAR input signal to the optical switch 100 which directs the LIDAR input signal back to the utility waveguide 16. The chip and electronics can then process the LIDAR input signal as described elsewhere in this application.

During operation of the system, the electronics can delay switching the alternate waveguide 102 that receives the outgoing LIDAR signal until the chip has received the reflected LIDAR input signal that is needed for the desired processing. As a result, the LIDAR output signal and the associated LIDAR input signal are guided by the same alternate waveguide 102.

The optical switch 100 may be monolithically integrated on the same LIDAR chip, or may be separate from the LIDAR chip and connected by an optical fiber.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical system, comprising:
   a LIDAR chip that includes a switch configured to direct an outgoing LIDAR signal to one of multiple different alternate waveguides;
   a redirection component configured to receive the outgoing LIDAR signal from any one of the alternate waveguides and configured to redirect the received outgoing LIDAR signal such that a direction that the outgoing LIDAR signal travels away from the redirection component changes in response to changes in the alternate waveguide from which the redirection component receives the outgoing LIDAR signal,
      the redirection component including a splitter configured to receive the outgoing LIDAR signal from any one of the alternate waveguides and to split the outgoing LIDAR signal into multiple output signals; and
   multiple steering waveguides that are each configured to receive a different one of the output signals, and
      the steering waveguides being configured such that the output signals exit from the steering waveguides and combine to re-form the outgoing LIDAR signal with the re-formed outgoing LIDAR signal traveling away from the redirection component.

2. The system of claim 1, wherein the redirection component is configured such that the outgoing LIDAR signal travels away from the redirection component in a different direction when the redirection component receives the outgoing LIDAR signal from different alternate waveguides.

3. The system of claim 1, wherein the redirection component is configured such that the outgoing LIDAR signal travels away from the redirection component at a different transmission angle when the redirection component receives the outgoing LIDAR signal from different alternate waveguides, the transmission angle being measured relative to the redirection component.

4. The system of claim 1, wherein none of the directions that the outgoing LIDAR signal travel away from the redirection component are parallel to one another.

5. The system of claim 1, wherein the splitter is a wavelength independent splitter.

6. The system of claim 5, wherein the steering waveguides each terminates at a facet and the facets are arranged such that the output signals exiting from the steering waveguides through the facets.

7. The system of claim 6, wherein the steering waveguides each includes a phase tuner configured to tune a phase differential between output signals in the steering waveguides so as to tune a direction that the reformed outgoing LIDAR signal travels away from the redirection component.

8. The system of claim 7, further comprising:
electronics configured to operate the phase tuners such that the outgoing LIDAR signal is collimated as it travels away from the redirection component.

9. The system of claim 7, wherein the phase tuners are configured to tune the direction that the reformed outgoing LIDAR signal travels away from the redirection component over multiple angular ranges where each of the different angular ranges is associated with a different one of the alternate waveguides.

10. The system of claim 9, wherein each of the angular ranges covers different angles and the angular ranges associated with adjacent alternate waveguides overlap.

11. The system of claim 1, wherein there is not a phase differential between output signals at facet of adjacent steering waveguides.

12. The system of claim 1, wherein there is a linearly increasing phase differential between output signals at facet of adjacent steering waveguides.

13. The system of claim 1, wherein the switch is configured to direct the outgoing LIDAR signal to any one of multiple different alternate waveguides.

14. An optical system, comprising:
a LIDAR chip that includes a switch configured to direct an outgoing LIDAR signal to any one of multiple different alternate waveguides;
a redirection component configured to receive the outgoing LIDAR signal from any one of the alternate waveguides and configured to redirect the received outgoing LIDAR signal such that a direction that the outgoing LIDAR signal travels away from the redirection component changes in response to changes in the alternate waveguide from which the redirection component receives the outgoing LIDAR signal,
the redirection component including a wavelength independent splitter configured to receive the outgoing LIDAR signal from any one of the alternate waveguides and to split the outgoing LIDAR signal into multiple output signals; and
multiple steering waveguides that are each configured to receive a different one of the output signals, and
the steering waveguides each terminating at a facet with the facets being arranged such that the output signals exiting from the steering waveguides through the facets and combine to re-form the outgoing LIDAR signal with the re-formed outgoing LIDAR signal traveling away from the redirection component.

15. The system of claim 14, wherein the splitter is a wavelength independent splitter.

16. The system of claim 14, wherein the steering waveguides each includes a phase tuner configured to tune a phase differential between output signals in the steering waveguides so as to tune a direction that the reformed outgoing LIDAR signal travels away from the redirection component.

17. The system of claim 16, further comprising:
electronics configured to operate the phase tuners such that the outgoing LIDAR signal is collimated as it travels away from the redirection component.

18. The system of claim 16, wherein the phase tuners are configured to tune the direction that the reformed outgoing LIDAR signal travels away from the redirection component over multiple angular ranges where each of the different angular ranges is associated with a different one of the alternate waveguides.

19. The system of claim 18, wherein each of the angular ranges covers different angles and the angular ranges associated with adjacent alternate waveguides overlap.

* * * * *